US012690020B2

(12) United States Patent
Jung et al.

(10) Patent No.: US 12,690,020 B2
(45) Date of Patent: Jul. 21, 2026

(54) INDICATION OF UPLINK TRANSMISSION IN DOWNLINK SYMBOL

(71) Applicant: Lenovo (Singapore) Pte. Ltd., New Tech Park (SG)

(72) Inventors: Hyejung Jung, Northbrook, IL (US); Alexander Johann Maria Golitschek Edler von Elbwart, Darmstadt (DE); Hossein Bagheri, Urbana, IL (US); Ankit Bhamri, Rödermark (DE); Vijay Nangia, Woodridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 306 days.

(21) Appl. No.: 18/549,135

(22) PCT Filed: Mar. 4, 2022

(86) PCT No.: PCT/IB2022/051950
§ 371 (c)(1),
(2) Date: Sep. 5, 2023

(87) PCT Pub. No.: WO2022/185281
PCT Pub. Date: Sep. 9, 2022

(65) Prior Publication Data
US 2024/0172199 A1 May 23, 2024

Related U.S. Application Data

(60) Provisional application No. 63/156,807, filed on Mar. 4, 2021.

(51) Int. Cl.
H04L 1/00 (2006.01)
H04L 5/00 (2006.01)
(Continued)

(52) U.S. Cl.
CPC ....... H04W 72/0446 (2013.01); H04L 5/0053 (2013.01); H04L 5/14 (2013.01)

(58) Field of Classification Search
CPC ............. H04W 72/0446; H04W 72/23; H04L 5/0053; H04L 5/14; H04L 5/0051; H04L 5/0044
See application file for complete search history.

(56) References Cited

U.S. PATENT DOCUMENTS

| | | | |
|---|---|---|---|
| 11,553,482 B2 * | 1/2023 | Fakoorian | ............. H04L 5/0094 |
| 2020/0228196 A1 | 7/2020 | Wilson | |

(Continued)

FOREIGN PATENT DOCUMENTS

| | | |
|---|---|---|
| WO | 2021188785 A1 | 9/2021 |
| WO | 2022006342 A1 | 1/2022 |

OTHER PUBLICATIONS

PCT/IB2022/051950, "International Search Report and the Written Opinion of the International Searching Authority, or the Declaration", International Searching Authority, May 30, 2022, pp. 1-11.

(Continued)

*Primary Examiner* — Abdelnabi O Musa
(74) *Attorney, Agent, or Firm* — Kunzler Needham Hilton

(57) ABSTRACT

Apparatuses, methods, and systems are disclosed for flexible uplink (UL) and downlink (DL) communications with full duplex operation. One apparatus includes a transceiver that receives a first indication to operate in a full duplex aware mode and receives slot format information of a slot. The apparatus includes a processor that controls the transceiver to perform at least one action selected from: uplink transmission in a first set of symbols of the slot and downlink reception in a second set of symbols of the slot, where at least one symbol of the first set of symbols of the slot is a downlink symbol according to the slot format information, and where at least one symbol of the second set of symbols (Continued)

of the slot is an uplink symbol according to the slot format information.

17 Claims, 8 Drawing Sheets

(51) Int. Cl.
    *H04L 5/14*        (2006.01)
    *H04W 72/0446*     (2023.01)

(56)                References Cited

U.S. PATENT DOCUMENTS

| | | | | |
|---|---|---|---|---|
| 2021/0297226 | A1* | 9/2021 | Abotabl | H04L 5/0094 |
| 2021/0345389 | A1* | 11/2021 | Fakoorian | H04L 5/0096 |
| 2021/0377926 | A1* | 12/2021 | Li | H04L 5/14 |
| 2021/0377938 | A1* | 12/2021 | Huang | H04W 72/1263 |
| 2022/0007395 | A1* | 1/2022 | Lei | H04L 1/0003 |
| 2022/0078768 | A1* | 3/2022 | El Hamss | H04L 1/1812 |
| 2022/0272547 | A1* | 8/2022 | Noh | H04B 7/15528 |
| 2022/0294597 | A1* | 9/2022 | Ibrahim | H04L 5/14 |
| 2022/0369297 | A1* | 11/2022 | Takahashi | H04W 72/23 |
| 2023/0090758 | A1* | 3/2023 | Zhang | H04L 5/14 |
| | | | | 370/277 |
| 2023/0284039 | A1* | 9/2023 | Lin | H04W 16/28 |
| 2023/0291523 | A1* | 9/2023 | Hasegawa | H04W 52/281 |
| 2023/0328704 | A1* | 10/2023 | Oh | H04W 72/232 |
| | | | | 370/329 |

OTHER PUBLICATIONS

Ericsson, "Summary of 7.1.3.1 (DCI contents and formats)", TSG-RAN WG1 #94 R1-1809701, Aug. 20-24, 2018, pp. 1-19.

Qualcomm Inc., "PUSCH Enhancements for eURLLC", 3GPP TSG-RAN WG1 #99 R1-1912961, Nov. 18-22, 2019, pp. 1-7.

Nokia et al., "Summary #4 of PUSCH enhancements for NR eURLLC (AI 7.2.6.3)", 3GPP TSG-RAN WG1 Meeting #99 R1-1913519, Nov. 18-22, 2019, pp. 1-49.

3GPP, "3rd Generation Partnership Project; Technical Specification Group Radio Access Network; NR; Requirements for support of radio resource management (Release 17)", 3GPP TS 38.133 V17.0.0, Dec. 2020, pp. 1-1812.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

100

UE
205

RAN
node
207

305 1. RAN configures UE for full-duplex aware operation 310 2. RAN sends grant and full duplex indication
(e.g., UE-specific DCI format, RAR UL grant,
fallbackRAR UL grant, successRAR, etc.)

3. UE ignores slot
format indication in
response to full
duplex indication

315

320 4. UE sends UL transmission on DL slot using grant

300

UE
205

RAN
node
207

405  1. RAN configures UE for full-duplex aware operation 410  2. RAN sends grant and full duplex indication
(e.g., UE-specific DCI format, etc.)

3. UE ignores slot
format indication in
response to full
duplex indication
415

420  4. UE receives DL transmission on UL slot using grant

400

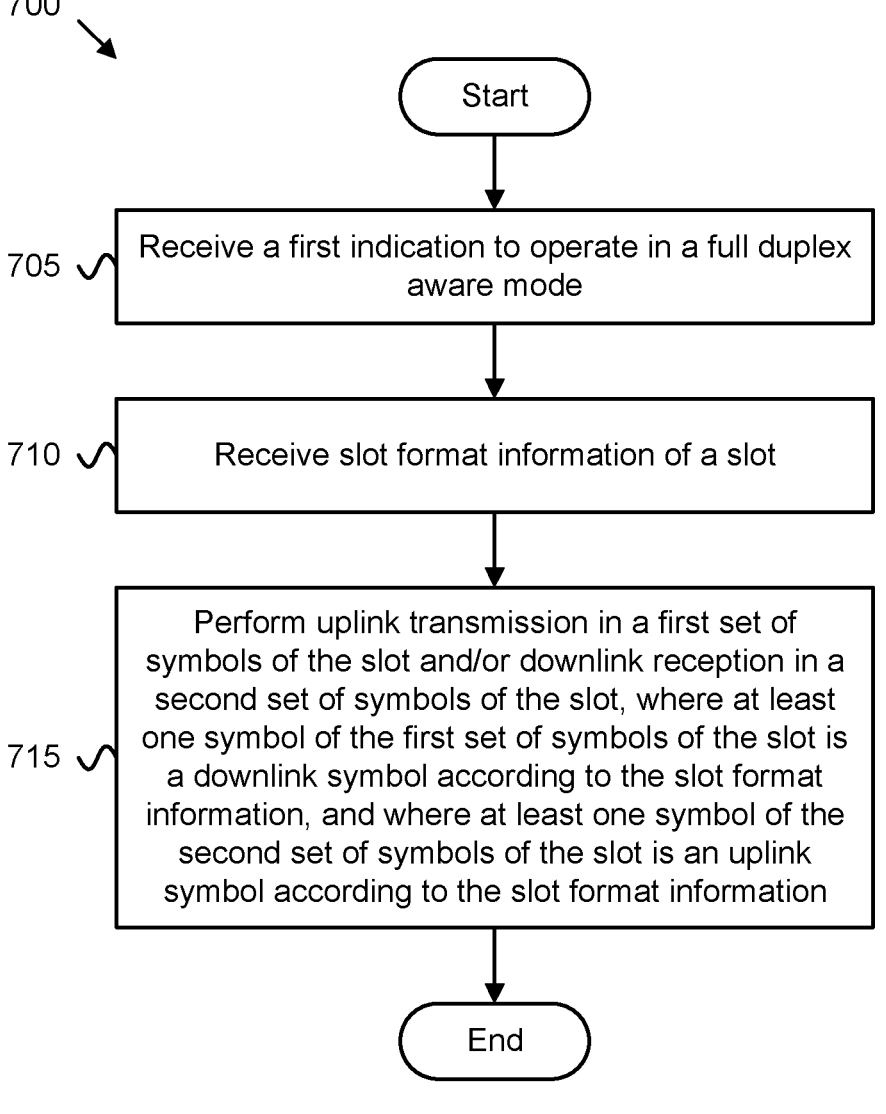

700

Start

705 — Receive a first indication to operate in a full duplex aware mode

710 — Receive slot format information of a slot

715 — Perform uplink transmission in a first set of symbols of the slot and/or downlink reception in a second set of symbols of the slot, where at least one symbol of the first set of symbols of the slot is a downlink symbol according to the slot format information, and where at least one symbol of the second set of symbols of the slot is an uplink symbol according to the slot format information End

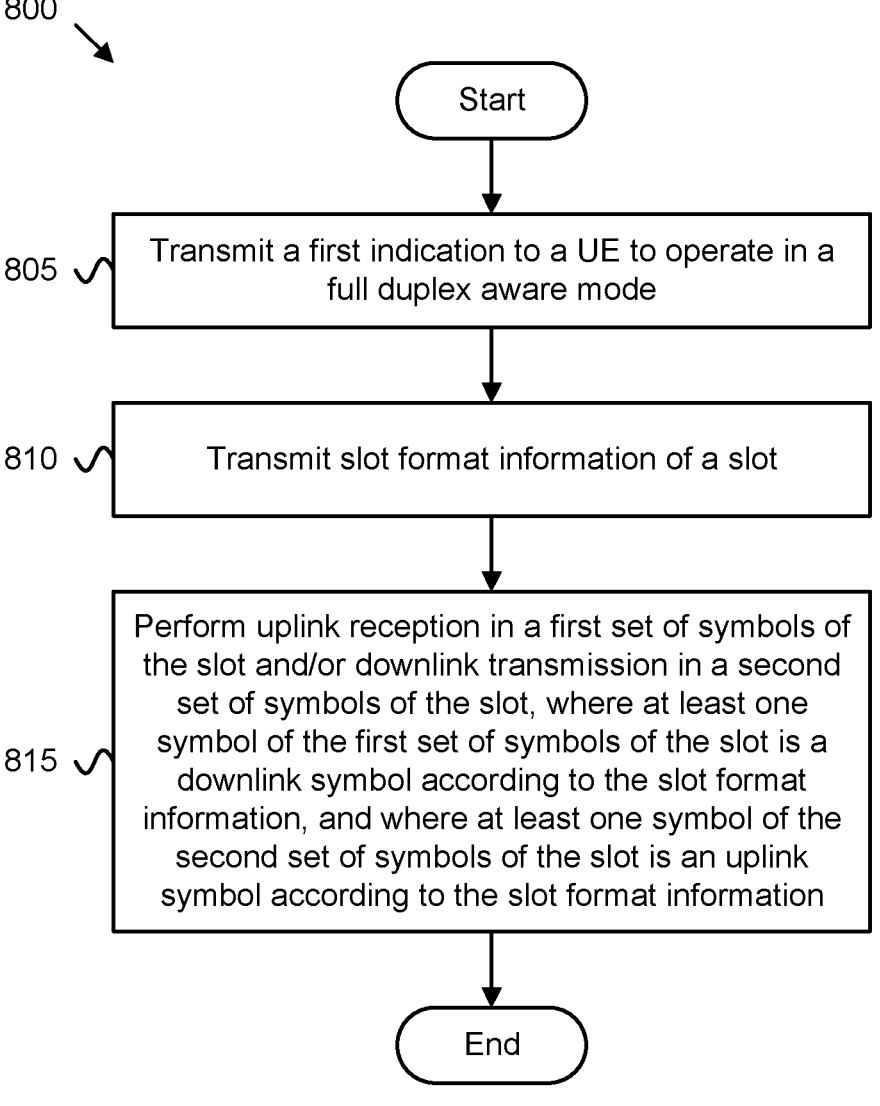

Start

805 ⌇ Transmit a first indication to a UE to operate in a full duplex aware mode 810 ⌇ Transmit slot format information of a slot 815 ⌇ Perform uplink reception in a first set of symbols of the slot and/or downlink transmission in a second set of symbols of the slot, where at least one symbol of the first set of symbols of the slot is a downlink symbol according to the slot format information, and where at least one symbol of the second set of symbols of the slot is an uplink symbol according to the slot format information End

FIG. 8

INDICATION OF UPLINK TRANSMISSION IN DOWNLINK SYMBOL

CROSS-REFERENCE TO RELATED APPLICATIONS

This application claims priority to U.S. Provisional Patent Application No. 63/156,807 entitled "FLEXIBLE UPLINK AND DOWNLINK COMMUNICATIONS WITH FULL DUPLEX OPERATION" and filed on 4 Mar. 2021 for Hyejung Jung, Alexander Golitschek, Hossein Bagheri, Ankit Bhamri, Vijay Nangia, which application is incorporated herein by reference.

FIELD

The subject matter disclosed herein relates generally to wireless communications and more particularly relates to flexible uplink ("UL") and downlink ("DL") communications with full duplex operation.

BACKGROUND

For Third Generation Partnership Project ("3GPP") New Radio ("NR", i.e., $5^{th}$ generation Radio Access Technology ("RAT")), time-division duplexing ("TDD") may be used in unpaired spectrum to avoid interference (e.g., UL and/or DL interference within a network entity and UE-to-UE interference). However, TDD limits UL and DL transmission opportunities and prevents accommodating urgent UL and DL transmissions simultaneously.

BRIEF SUMMARY

Disclosed are procedures for flexible UL and DL communications with full duplex operation. Said procedures may be implemented by apparatus, systems, methods, or computer program products.

One method at a User Equipment ("UE") for flexible UL and DL communications with full duplex operation in a cell includes receiving a first indication to operate in a full duplex aware mode and receiving slot format information of a slot. The method includes performing at least one action selected from: uplink transmission in a first set of symbols of the slot and downlink reception in a second set of symbols of the slot, where at least one symbol of the first set of symbols of the slot is a downlink symbol according to the slot format information, and where at least one symbol of the second set of symbols of the slot is an uplink symbol according to the slot format information.

One method at a Radio Access Network ("RAN") for flexible UL and DL communications with full duplex operation in a cell includes transmitting a first indication to a UE to operate in a full duplex aware mode and transmitting slot format information of a slot. The method includes performing at least one action selected from: uplink reception in a first set of symbols of the slot, and downlink transmission in a second set of symbols of the slot, where at least one symbol of the first set of symbols of the slot is a downlink symbol according to the slot format information, and where at least one symbol of the second set of symbols of the slot is an uplink symbol according to the slot format information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flowchart diagram illustrating one embodiment of a first method for flexible UL and DL communications with full duplex operation in a cell; and FIG. 8 is a flowchart diagram illustrating one embodiment of a second method for flexible UL and DL communications with full duplex operation.

DETAILED DESCRIPTION

Figure 1:
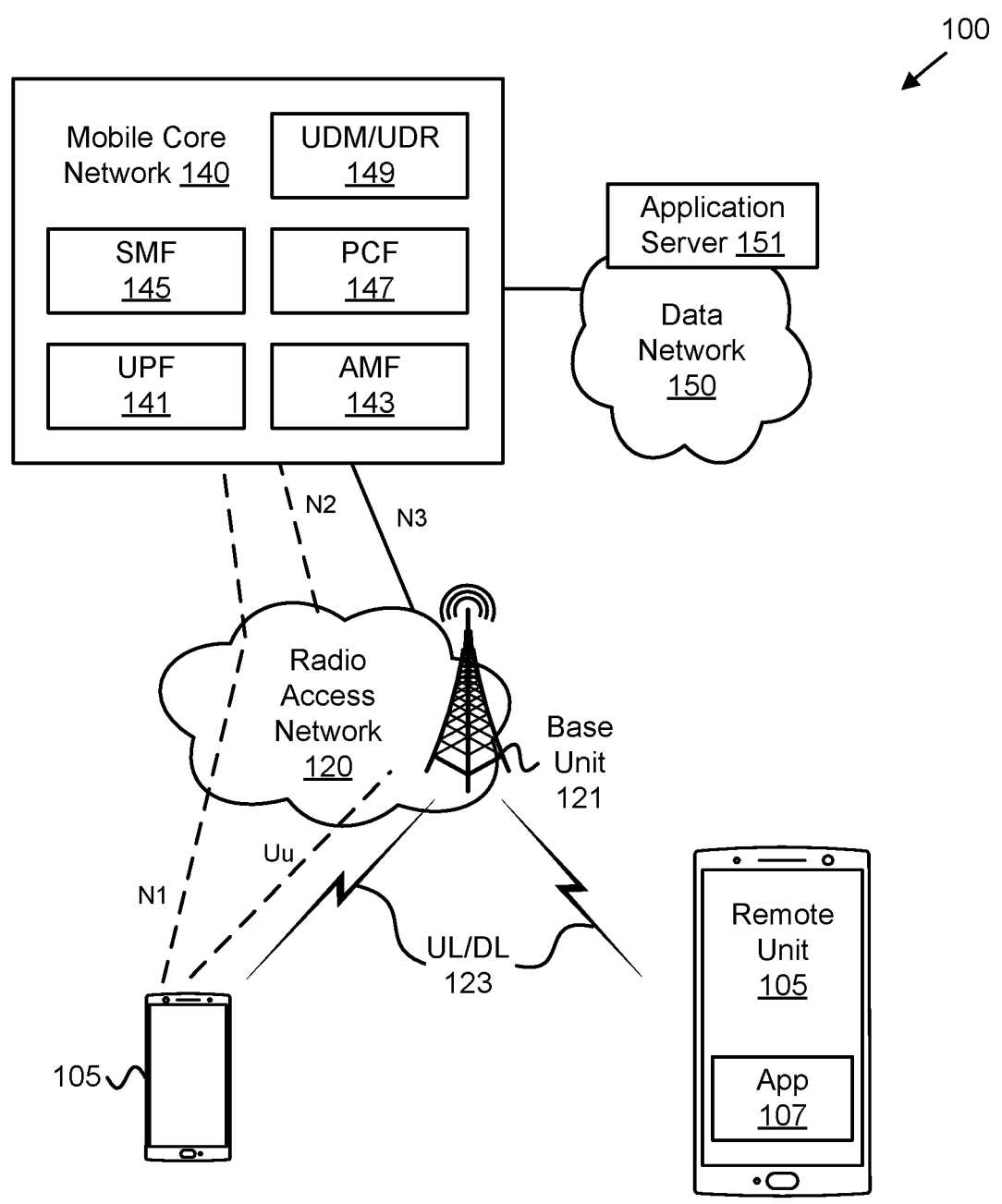
FIG. 1 is a block diagram illustrating one embodiment of a wireless communication system for flexible UL and DL communications with full duplex operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for flexible uplink ("UL") and downlink ("DL") communications with full duplex operation, e.g., performing an UL transmission in a DL portion of a slot and/or performing DL transmission in an UL portion of a slot. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Disclosed are solutions for flexible UL and DL communications with full duplex operation. The solutions may be implemented by apparatus, systems, methods, or computer program products. The disclosure presents solutions to provide a User Equipment device ("UE") with UL/DL symbols (or slots) or UL/DL resources opportunistically while ongoing UL/DL traffics are served, when a serving network entity is capable of simultaneous reception and transmission (i.e., capable of full duplexing with a certain level of self-interference suppression).

If a UE is configured to be operated in a full duplex aware ("FDA") mode, one solution includes the UE performing DL reception or UL transmission according to a received UE-specific Downlink Control Information ("DCI") format, Random-Access Response ("RAR") UL grant, fallbackRAR UL grant, or successRAR, irrespective of semi-statically configured or dynamically indicated (via group common DCI) slot format information.

If a UE is configured with a search space and/or Control Resource Set ("CORESET") being operated in an Full-Duplex Aware ("FDA") mode and if the UE does not detect a DCI format indicating to the UE to perform UL transmission in dynamic flexible symbols and/or dynamic UL symbols in a Physical Downlink Control Channel ("PDCCH") monitoring occasion of the search space/CORESET, the UE monitors PDCCH in the dynamic flexible and/or dynamic UL symbols in the PDCCH monitoring occasion.

If a UE is configured to monitor a DCI format for Slot Format Indicator ("SFI") indication specific to an FDA mode and if the UE detects an FDA mode specific DCI format indicating a set of symbols as UL/DL symbols, the UE transmits/receives a scheduled UL/DL channels/signals in the set of symbols, where the set of symbols are semi-statically configured or dynamically indicated (via legacy SFI, e.g., DCI format 2_0) DL/UL or flexible symbols.

In the following, details of slot configuration and slot format indication and related procedures specified in Rel-15/16 3GPP New Radio ("NR") are provided.

If the UE is additionally provided tdd-UL-DL-ConfigurationDedicated, the parameter tdd-UL-DL-ConfigurationDedicated overrides only flexible symbols per slot over the number of slots as provided by tdd-UL-DL-Configuration-Common. The tdd-UL-DL-ConfigurationDedicated provides: A) a set of slot configurations by slotSpecificConfigurationsToAddModList; B) for each slot configuration from the set of slot configurations; C) a slot index for a slot provided by slotIndex; and D) a set of symbols for a slot by symbols.

For the set symbols for a slot, if symbols='allDownlink,' then all symbols in the slot are downlink, and if symbols='allUplink,' then all symbols in the slot are uplink. Otherwise, if symbols='explicit,' then parameter 'nrof-DownlinkSymbols' provides a number of downlink first symbols in the slot and parameter 'nrofUplinkSymbols' provides a number of uplink last symbols in the slot. If parameter 'nrofDownlinkSymbols' is not provided, there are no downlink first symbols in the slot and if parameters 'nrofUplinkSymbols' is not provided, there are no uplink last symbols in the slot. The remaining symbols in the slot are considered flexible.

If a UE is not configured to monitor PDCCH for DCI format 2_0, for a set of symbols of a slot that are indicated as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, then the UE receives Physical Downlink Shared Channel ("PDSCH") or Channel State Information Reference Signal ("CSI-RS") in the set of symbols of the slot if the UE receives a corresponding indication by a DCI format and the UE transmits Physical Uplink Shared Channel ("PUSCH"), Physical Uplink Control Channel ("PUCCH"), Physical Random Access Channel ("PRACH"), or Sounding Reference Signal ("SRS") in the set of symbols of the slot if the UE receives a corresponding indication by a DCI format, a RAR UL grant, fallbackRAR UL grant, or successRAR.

For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot.

An SFI-index field value in a DCI format 2_0 indicates to a UE a slot format for each slot in a number of slots for each DL bandwidth part ("BWP") or each UL BWP starting from a slot where the UE detects the DCI format 2_0. The number of slots is equal to or larger than a PDCCH monitoring periodicity for DCI format 2_0. The SFI-index field includes bits where maxSFIindex is the maximum value of the values provided by corresponding slotFormatCombinationId. A slot format is identified by a corresponding format index as provided in Table 11.1.1-1 where 'D' denotes a downlink symbol, 'U' denotes an uplink symbol, and 'F' denotes a flexible symbol.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than '255.'

If one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols.

If an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot.

If an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot.

If an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot If the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration.

If the UE is configured by higher layers to receive DL Positioning Reference Signal ("PRS") in the set of symbols of the slot, the UE receives the DL PRS in the set of symbols of the slot only if an SFI-index field value in DCI format 2_0 indicates the set of symbols of the slot as downlink or flexible.

If the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink.

If the UE is configured by higher layers to transmit SRS in the set of symbols of the slot, the UE transmits the SRS only in a subset of symbols from the set of symbols of the slot indicated as uplink symbols by an SFI-index field value in DCI format 2_0.

A UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot.

A UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH, e.g., as described in 3GPP Technical Specification ("TS") 38.213, Clause 10.2.

A UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

For operation with shared spectrum channel access, if a UE is configured by higher layers to receive a CSI-RS and the UE is provided CO-DurationsPerCell, for a set of symbols of a slot that are indicated as downlink or flexible by tdd-UL-DL-ConfigurationCommon or tdd-UL-DL-ConfigurationDedicated, or when tdd-UL-DL-ConfigurationCommon and tdd-UL-DL-ConfigurationDedicated are not provided, the UE cancels the CSI-RS reception in the set of symbols of the slot that are not within the remaining channel occupancy duration.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then the UE does not expect to cancel the transmission in symbols from the set of symbols that occur, relative to a last symbol of a CORESET where the UE detects the DCI format 2_0 or the DCI format, after a number of symbols that is smaller than the PUSCH preparation time $T_{(proc,2)}$ for the corresponding PUSCH processing capability (see, e.g., 3GPP TS 38.214) assuming $d_{2,1}=1$ and $\mu$ corresponds to the smallest Subcarrier Spacing ("SCS") configuration between the SCS configuration of the PDCCH carrying the DCI format 2_0 or the DCI format and the SCS configuration of the SRS, PUCCH, PUSCH or $\mu\_r$, where $\mu\_r$ corresponds to the SCS configuration of the PRACH if it is 15 kHz or higher; otherwise $\mu\_r=0$. In certain embodiments, the UE cancels the PUCCH, or the PUSCH, or an actual repetition of the PUSCH, e.g., determined from Clauses 9 and 9.2.5 of 3GPP TS 38.213, or Clause 6.1 of 3GPP TS 38.214, or the PRACH transmission in remaining symbols from the set of symbols and cancels the SRS transmission in remaining symbols from the subset of symbols.

If a UE is configured by higher layers to receive a CSI-RS or detects a DCI format 0_1 indicating to the UE to receive a CSI-RS in one or more Radio Bearer ("RB") sets and a set of symbols of a slot, and the UE detects a DCI format 2_0 with bitmap indicating that any RB set from the one or more RB sets is not available for reception, the UE cancels the CSI-RS reception in the set of symbols of the slot.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-Configuration-Dedicated are not provided to the UE, and if the UE does not detect a DCI format 20 providing a slot format for the slot, then the UE receives PDSCH or CSI-RS in the set of symbols of the slot if the UE receives a corresponding indication by a DCI format.

The UE transmits PUSCH, PUCCH, PRACH, or SRS in the set of symbols of the slot if the UE receives a corresponding indication by a DCI format, a RAR UL grant, fallbackRAR UL grant, or successRAR. The UE receives PDCCH as described in Clause 10.1 of 3GPP TS 38.213.

If the UE is configured by higher layers to receive PDSCH in the set of symbols of the slot, the UE does not receive the PDSCH in the set of symbols of the slot.

If the UE is configured by higher layers to receive CSI-RS in the set of symbols of the slot, the UE does not receive the CSI-RS in the set of symbols of the slot, except when UE is provided CO-DurationsPerCell and the set of symbols of the slot are within the remaining channel occupancy duration.

If the UE is configured by higher layers to receive DL PRS in the set of symbols of the slot, the UE receives the DL PRS.

If the UE is configured by higher layers to transmit SRS, or PUCCH, or PUSCH, or PRACH in the set of symbols of the slot and the UE is not provided enableConfiguredUL, then the UE does not transmit the PUCCH, or the PUSCH, or the PRACH in the slot and does not transmit the SRS in symbols from the set of symbols in the slot, if any, starting from a symbol that is after PUSCH preparation time $T\_(proc,2)$ for the corresponding PUSCH timing capability (see, e.g., 3GPP TS 38.214) assuming $d\_2,1{=}1$ after a last symbol of a CORESET where the UE is configured to monitor PDCCH for DCI format 2_0 and μ corresponds to the smallest SCS configuration between the SCS configuration of the PDCCH carrying the DCI format 2_0 and the SCS configuration of the SRS, PUCCH, PUSCH or μ_r, where μ_r corresponds to the SCS configuration of the PRACH if it is 15 kHz or higher; otherwise μ_r=0.

Further, the UE does not expect to cancel the transmission of the SRS, or the PUCCH, or the PUSCH, or the PRACH in symbols from the set of symbols in the slot, if any, starting before a symbol that is after the PUSCH preparation time $T\_(proc,2)$ for the corresponding PUSCH timing capability (see, e.g., 3GPP TS 38.214) assuming $d\_2,1{=}1$ after a last symbol of a CORESET where the UE is configured to monitor PDCCH for DCI format 2_0 and corresponds to the smallest SCS configuration between the SCS configuration of the PDCCH carrying the DCI format 2_0 and the SCS configuration of the SRS, PUCCH, PUSCH or μ_r, where μ_r corresponds to the SCS configuration of the PRACH if it is 15 kHz or higher; otherwise μ_r=0.

If the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

For unpaired spectrum operation for a UE on a cell in a frequency band of Frequency Range #1 ("FR1", i.e., referring to radio frequencies between 410 MHz to 7.125 GHz), and when the scheduling restrictions due to Radio Resource Management ("RRM") measurements (see, e.g., 3GPP TS 38.133) are not applicable, if the UE detects a DCI format indicating to the UE to transmit in a set of symbols, the UE is not required to perform RRM measurements (see, e.g., 3GPP TS 38.133) based on a Synchronization Signal/Physical Broadcast Channel ("SS/PBCH") block or CSI-RS reception on a different cell in the frequency band if the SS/PBCH block or CSI-RS reception includes at least one symbol from the set of symbols.

FIG. 1 depicts a wireless communication system 100 for flexible UL and DL communications with full duplex operation, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, abase station, a Node-B ("NB"), an Evolved Node B (abbre-viated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termi-nation of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for flexible UL and DL communications with full duplex operation apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

According to a first solution, if a remote unit 105 is configured to be operated in a full duplex aware ("FDA") mode, then the remote unit 105 performs DL reception or UL transmission according to a received UE-specific DCI format, RAR UL grant, fallbackRAR UL grant, or successRAR, irrespective of semi-statically configured or dynamically indicated (via group common DCI) slot format information.

According to a second solution, if a remote unit 105 is configured with a search space/CORESET being operated in an FDA mode and if the remote unit 105 does not detect a DCI format indicating to the remote unit 105 to perform UL transmission in dynamic flexible symbols and/or dynamic UL symbols in a PDCCH monitoring occasion of the search space/CORESET, the remote unit 105 monitors PDCCH in the dynamic flexible and/or dynamic UL symbols in the PDCCH monitoring occasion.

According to a third solution, if a remote unit 105 is configured to monitor a DCI format for SFI indication specific to an FDA mode and if the remote unit 105 detects an FDA mode specific DCI format indicating a set of symbols as UL/DL symbols, the remote unit 105 transmits/receives a scheduled UL/DL channels/signals in the set of symbols, where the set of symbols are semi-statically configured or dynamically indicated (via legacy SFI, e.g., DCI format 2_0) DL/UL or flexible symbols.

In contrast, according to 3GPP Rel-15/16, a remote unit 105 does not transmit/receive on cell-specifically configured or group specifically indicated DL/UL symbols. Furthermore, a remote unit 105 can transmit/receive on cell-specifically configured or group specifically indicated flexible symbols if the remote unit 105 receives a dynamic indication to transmit/receive on the flexible symbols.

The solutions described herein allow a network entity (e.g., the base unit 121) to dynamically schedule PDSCH/PUSCH/PUCCH for a remote unit 105 on cell-specifically configured or group specifically indicated UL/DL symbols, when an urgent DL/UL packet(s) or uplink control information needs to be delivered to/from the remote unit 105. Also, by configurating a remote unit 105 with a search space/CORESET that can be operated in cell-specific/group-specific flexible and/or UL symbols, a network entity can transmit urgent downlink control information to the remote unit 105 while receiving configured and/or scheduled UL channels/signals from other remote units 105.

In the following descriptions, the term "gNB" is used for the base station/base unit, but it is replaceable by any other radio access node, e.g., RAN node, ng-eNB, eNB, Base Station ("BS"), Access Point ("AP"), NR BS, 5G NB, Transmission/Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for flexible UL and DL communications with full duplex operation.

It should be understood that this disclosure uses the terms Channel State Information Reference Signal Resource Index ("CRI"), and Synchronization Signal/Physical Broadcast Channel Block Resource Index ("SSBRI"), and beam are used interchangeably. interchangeably.

Figure 2:
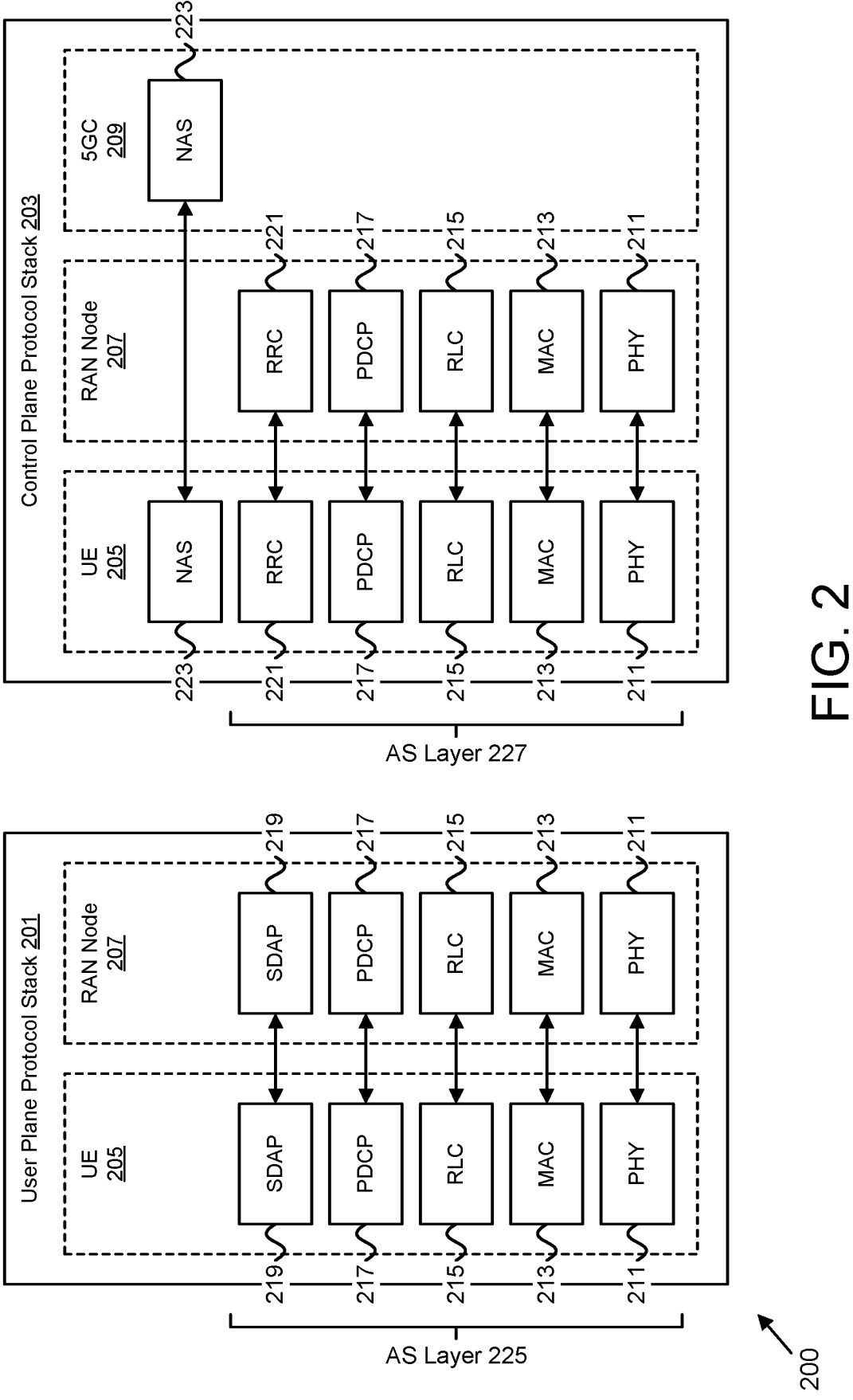
FIG. 2 is a diagram illustrating one embodiment of a Third Generation Partnership Project ("3GPP") New Radio ("NR") protocol stack.

FIG. 2 depicts a NR protocol stack 200, according to embodiments of the disclosure. While FIG. 2 shows a UE 205, a RAN node 207 and the 5G core network 209, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, a Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least SDAP, PDCP, RLC and MAC sublayers, and the physical layer. The AS layer 227 for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs").

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the physical layer through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks etc.

According to embodiments of a first solution, when a network entity (e.g., gNB) is capable of simultaneous reception and transmission (i.e., capable of full duplexing with a certain level of self-interference suppression), it can configure some UEs in a cell to perform UL transmissions (or DL receptions) even though a symbol(s)/slot(s) overlapping with (or of) the UL transmissions (or the DL receptions) is indicated as a DL (or UL) symbol(s)/slot(s).

In various embodiments of the first solution, a UE 205, if configured, performs a DL reception(s) and/or an UL transmission(s) irrespective of semi-static and/or dynamic indication of slot format information, when detecting a UE-specific DCI format, a RAR UL grant, a fallbackRAR UL grant, or a successRAR indicating the DL reception(s) and/or the UL transmission(s).

Figure 3:
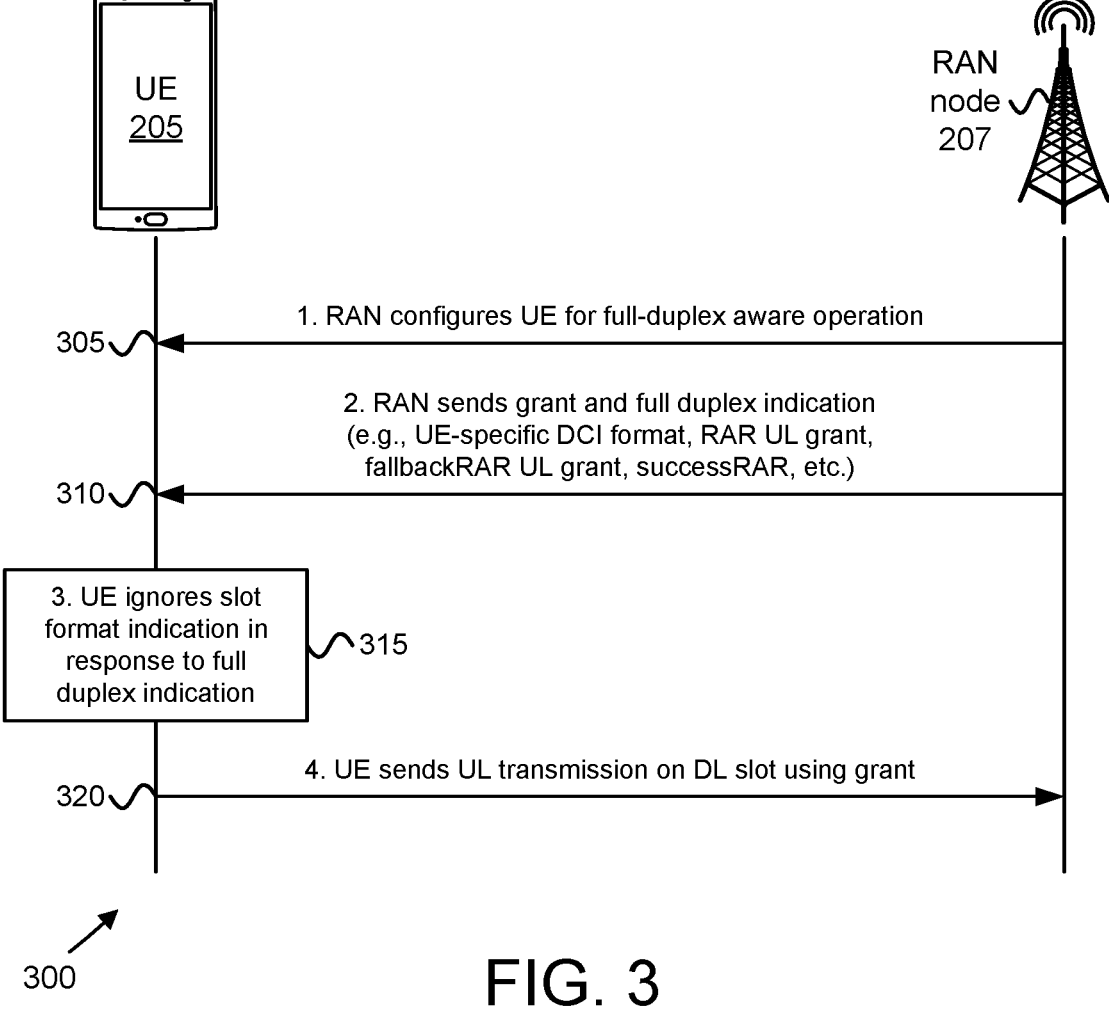
FIG. 3 is a diagram illustrating one embodiment of a procedure for triggering full duplex operation in a cell.

FIG. 3 depicts an exemplary procedure 300 for full duplex operation in a cell, according to embodiments of the disclosure. The procedure 300 involves the UE 205 (e.g., one embodiment of the remote unit 105) and the RAN node 207 (e.g., one embodiment of the base unit 121).

At Step 1, the RAN node 207 configures the UE 205 for full duplex aware operation, as described in further detail below (see messaging 305).

At Step 2, at some later point, the RAN node 207 sends a full duplex indication to the UE 205 (see messaging 310). In certain embodiments, the full duplex indication is a UE-specific DCI format, a RAR UL grant, a fallbackRAR UL grant, or a successRAR indicating the DL reception(s) and/or the UL transmission(s).

At Step 3, because the full duplex operation in the cell is triggered, the UE 205 ignores the slot format (see block 315). In an alternative embodiment, the UE 205 may ignore a subframe format.

At Step 4, the UE 205 performs UL transmission to the RAN node 207 during a DL slot/subframe in response to the full duplex indication (see messaging 320).

Figure 4:
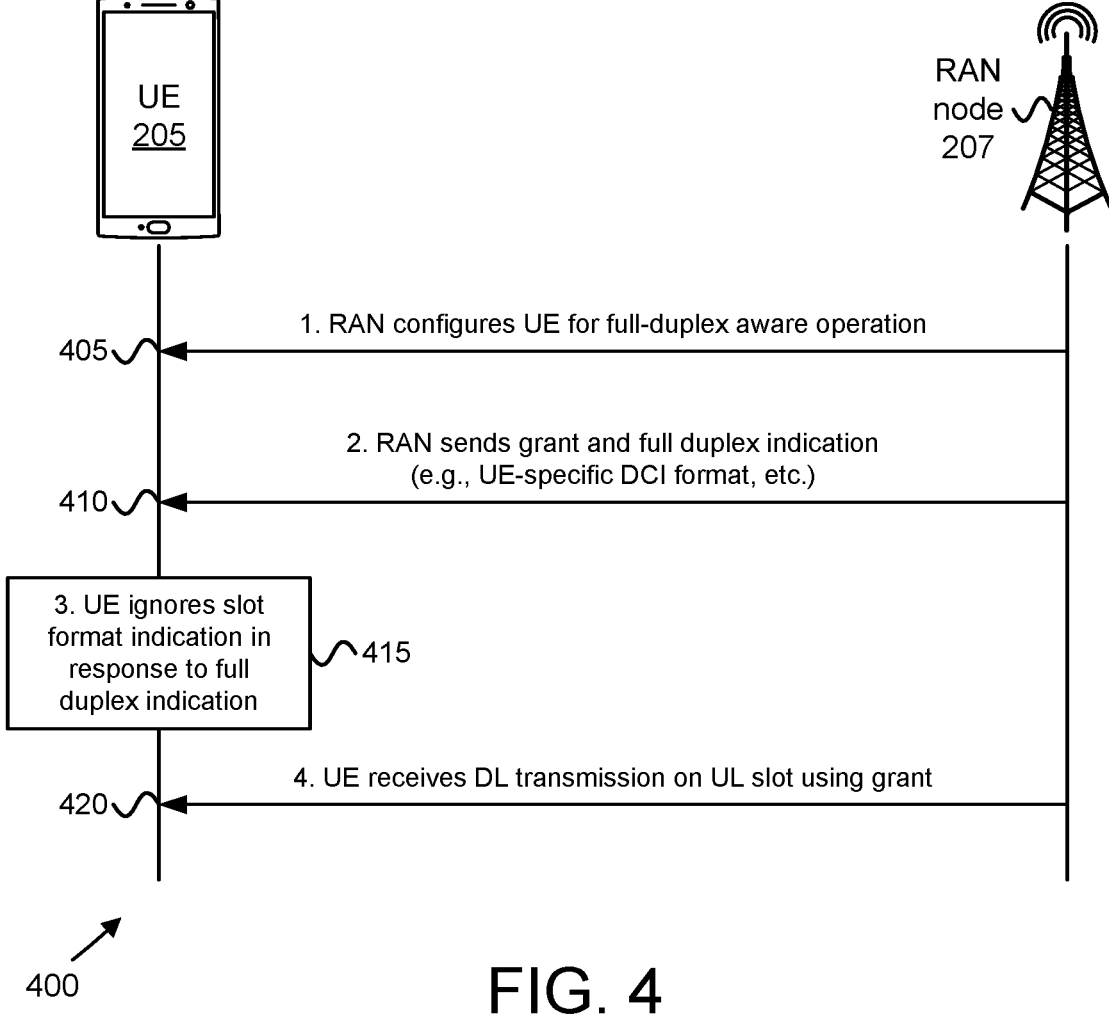
FIG. 4 is a diagram illustrating another embodiment of a procedure for triggering full duplex operation in a cell.

FIG. 4 depicts an exemplary procedure 400 for full duplex operation in a cell, according to embodiments of the disclosure. The procedure 400 involves the UE 205 and the RAN node 207.

At Step 1, the RAN node 207 configures the UE 205 for full duplex aware operation, as described in further detail below (see messaging 405).

At Step 2, at some later point, the RAN node 207 sends a full duplex indication to the UE 205 (see messaging 410). In certain embodiments, the full duplex indication is a UE-specific DCI format, a RAR UL grant, a fallbackRAR UL grant, or a successRAR indicating the DL reception(s) and/or the UL transmission(s).

At Step 3, because the full duplex operation in the cell is triggered, the UE 205 ignores the slot format (see block 415). In an alternative embodiment, the UE 205 may ignore a subframe format.

At Step 4, the RAN node 207 performs DL transmission to the UE 205 during an UL slot/subframe in response to the full duplex indication (see messaging 420).

In an example of the first solution, if the UE 205 is configured with higher layer parameter 'fullDuplexAware', then the UE 205 may receive a PDSCH/dynamically triggered CSI-RS overlapping with a set of semi-statically configured UL symbols in response to detecting a corresponding PDCCH scheduling the PDSCH/triggering the CSI-RS. Similarly, if the UE 205 is configured with higher layer parameter 'fullDuplexAware,' then the UE 205 may transmit a PUSCH, PUCCH, PDCCH ordered PRACH, or dynamically triggered SRS overlapping with a set of semi-statically configured DL symbols in response to detecting a corresponding PDCCH scheduling the PUSCH, PUCCH, PRACH, or SRS.

In some embodiments of the first solution, the 'fullDuplexAware' configuration/capability can be associated with phy-PriorityIndex parameter. Note that instead of 'fullDuplexAware,' other parameter names may be used such as 'enable-tdd-UL-DL-Override.'

Further, the UE 205 may transmit HARQ-ACK feedback for the received PDSCH on a PUCCH or PUSCH overlapping with a set of semi-statically configured DL symbols. As used herein, "HARQ-ACK" may represent collectively the Positive Acknowledge ("ACK") and the Negative Acknowledge ("NACK"), where ACK means that a Transport Block ("TB") is correctly received, and NACK (or NAK) means a TB is erroneously received.

A network entity (e.g., RAN node 207) may schedule the PDSCH/trigger the CSI-RS (and the associated PUCCH or the PUSCH/PUCCH/PRACH/SRS) for the UE 205 on the semi-statically configured UL (or DL) symbols, when an urgent DL (or UL) packet(s), DL Channel State Information ("CSI") measurement and reporting, UL beam/CSI measurement, or control information needs to be delivered to (or from) the UE 205.

In another example of the first solution, if the UE 205 is configured with higher layer parameter 'fullDuplexAware,' the UE 205 receives a PDSCH or CSI-RS (or transmits a PUSCH, PUCCH, PRACH, or SRS) overlapping with a set of dynamically indicated UL (or DL) symbols, e.g., via DCI format 2_0, in response to detecting a corresponding PDCCH scheduling/triggering the PDSCH/CSI-RS (or PUSCH/PUCCH/PRACH/SRS). For example, the RAN node 207 can indicate to a group of UEs a set of semi-statically configured flexible symbols as UL symbols to enable an UL transmission(s) from legacy UEs (e.g., Rel-15/16 UEs), while scheduling a DL transmission(s) to a full-duplex aware UE (i.e., the UE 205 configured with the higher layer parameter 'fullDuplexAware').

In another example of the first solution, the RAN node 207 may indicate to a first set of UEs a set of semi-statically configured flexible symbols as UL symbols and may indicate to a second set of UEs at least a portion of the set of semi-statically configured flexible symbols as DL symbols. Here, the first set of UEs may be associated with a first set of beams or spatial relations or Synchronization Signal/Physical Broadcast Channel Block ("SSB") indices or reference signal indices (e.g., CSI-RS indices), and the second set of UEs may be associated with a second set of beams or spatial relations or SSB indices or reference signal indices. The RAN node 207 may configure full-duplex capability in a portion of the semi-statically configured flexible symbols.

In some examples of the first solution, a UE 205 may be half-duplex or full-duplex (e.g., simultaneous reception and transmission capable), and the RAN node 207 may be capable of full-duplex.

In an example of the first solution, the corresponding PDCCH scheduling/triggering the PDSCH or CSI-RS (or PUSCH, PUCCH, PRACH, or SRS): has a (new) DCI format (other than 1_0, 1_1, 1_2,) and/or has a (new) Radio Network Temporary Identifier ("RNTI"), e.g., Full Duplex Aware RNTI ("FDA-RNTI"), and/or includes a field to indicate whether the reception/transmission associated with the PDCCH in symbols indicated as uplink/downlink via cell-specific, UE-specific, and/or group-specific slot format indication signaling is allowed/prioritized.

In an example of the first solution, the UE 205 may report, e.g., via a UE-capability signaling, a capability to be configured with the higher layer parameter 'fullDuplexAware.' In some embodiments, 'fullDuplexAware' is defined per serving cell, and the maximum number of serving cells wherein the UE 205 is capable of being 'fullDuplexAware' is reported by the UE 205 as a UE capability. In certain embodiments, a UE 205 that has only single antenna panel is not expected to be configured with the higher layer parameter 'fullDuplexAware.'

In an example of the first solution, the UE 205 may be configured with a full duplex aware mode separately for each serving cell. That is, a first serving cell of the UE 205 includes the higher layer parameter 'fullDuplexAware,' while a second serving cell of the UE 205 does not include the higher layer parameter 'fullDuplexAware' (i.e., the UE 205 does not perform transmission/reception in symbols indicated as DL/UL in the second serving cell).

In another example of the first solution, for the UE 205 configured with multiple serving cells and is provided half-duplex-behavior='enable,' and is not capable of simultaneous transmission and reception on any cell from the multiple serving cells, and indicates support of capability for half-duplex operation in carrier aggregation ("CA") with unpaired spectrum, and is not configured to monitor PDCCH for detection of DCI format 2-0 on any of the multiple serving cells, the UE 205 determines the symbol type (downlink, uplink, flexible) on a serving cell of the multiple serving cells based on whether the UE 205 is configured with full duplex aware mode for the serving cell.

For example, the UE 205 may be configured with higher layer parameter 'fullDuplexAware' for the serving cell, and on a symbol indicated as uplink (or downlink) by tdd-UL-DL-ConfigurationCommon or tdd-UL-DL-Configuration-Dedicated, and the UE 205 is scheduled to receive a PDSCH/dynamically triggered CSI-RS (or transmits a PUSCH, PUCCH, PDCCH ordered PRACH, or dynamically triggered SRS) on the symbol in response to detecting a corresponding PDCCH scheduling the PDSCH/triggering the CSI-RS (or PUSCH, PUCCH, PRACH, or SRS). Accordingly, the UE 205 determines the symbol as a downlink (or uplink) symbol, i.e., assumes the symbol type indication by tdd-UL-DL-ConfigurationCommon or tdd-UL-DL-ConfigurationDedicated to be a downlink (or uplink) symbol instead of an uplink (or downlink) symbol.

In some embodiments of the first solution, if the UE 205 is configured/indicated with 'fullDuplexAware' parameter, it can be additionally configured/indicated with a configuration to allow dynamic triggering of FD operation on a sub-set of symbols, i.e., to indicate a subset DL (alternatively, UL) symbols that can be used for UL (alternatively, DL) transmission within a set of DL (alternatively, UL) symbols.

In one example implementation, the UE 205 is pre-configured to allow FD triggering on all DL symbols except on symbols that are indicated as ssb-PositionsInBurst in System Information Block #1 ("SIB1") and/or pdcch-ConfigSIB1 in Master Information Block ("MIB") for a CORE-SET for Type0-PDCCH Common Search Space ("CSS"), or some combination thereof. In another implementation, if the UE 205 is configured/indicated with 'fullDuplexAware' parameter, it can be explicitly indicated in scheduling/activating DCI with a bitmap or semi-statically configured to indicate the symbols on which dynamic FD triggering is allowed or not allowed.

In one implementation, the UE 205 is configured/indicated with 'fullDuplexAware' parameter and is scheduled with PUSCH type B repetition, then the symbols determined as invalid symbols (e.g., according to clause 6.1.2.1 of 3GPP TS 38.214) can be used for PUSCH repetitions. In some implementation, only a subset of invalid symbols can be used for PUSCH type B repetition. For example, if the UE 205 is configured with invalidSymbolPatternIndicatorDCI-0-1/2 and invalid symbol pattern indicator field is set to '1', then those symbols cannot be used for PUSCH repetitions.

In some embodiments of the first solution, if the UE 205 is configured with higher layer parameter 'fullDuplexAware' within a search space configuration and/or an associated CORESET configuration and if the UE 205 does not detect a DCI format, RAR UL grant, fallbackRAR UL grant, or successRAR indicating to the UE 205 to transmit SRS, PUSCH, PUCCH, or PRACH, and/or is not configured with UL CG type 1, and/or is not activated with UL CG type2 resources in dynamic flexible and/or dynamic UL symbols in a PDCCH monitoring occasion of the search space/CORESET, the UE 205 performs PDCCH monitoring in the dynamic flexible and/or dynamic UL symbols in the PDCCH monitoring occasion of the search space/CORE-SET. By configuring the UE 205 with the search space/CORESET that can be operated in cell-specific/group-specific flexible and/or UL symbols, the RAN node 207 can transmit urgent downlink control information to the UE 205 while receiving configured and/or scheduled UL channels/signals from other UEs.

In an example, the UE 205 can be provided with a higher layer parameter monitoringCapabilityConfig-FD for a serving cell, and the UE 205 obtains an indication to monitor PDCCH on the serving cell for a maximum number of PDCCH candidates and non-overlapping Control Channel Elements ("CCEs") on the (dynamic) UL symbols per slot/span which is different or 'in addition to' than the maximum number of PDCCH candidates and non-overlapping CCEs defined in 3GPP Release 16. In an example, the UE 205 should perform overbooking and candidate/search space dropping in the serving cell in which the RAN node 207 can perform full-duplex operation.

In an example, the UE 205 is not expected to monitor PDCCH candidates in (dynamic) UL symbols, however, the UE 205 can be scheduled with a PDCCH to receive DL signals/channels on (dynamic) UL symbols. One motivation could be easier management of maximum number of PDCCH candidates and non-overlapping CCEs at the expense of less scheduling flexibility.

In one embodiment of the first solution, if the UE 205 is configured with higher layer parameter 'fullDuplexAware' within a CSI report configuration, a CSI resource configuration, and/or a particular Non-zero power CSI-RS ("NZP-CSI-RS") resource set (or NZP-CSI-RS resource) and/or CSI Interference Measurement ("CSI-IM") resource set (or CSI-IM resource) and if the UE 205 does not detect a DCI format, RAR UL grant, fallbackRAR UL grant, or successRAR indicating to the UE 205 to transmit SRS, PUSCH, PUCCH, or PRACH in dynamic flexible and/or dynamic UL symbols in a CSI resource associated with the CSI report configuration or the CSI resource configuration, the UE 205 performs CSI measurements in the dynamic flexible and/or dynamic UL symbols in the CSI resource. By configuring the UE 205 with CSI resources that can be operated in cell-specific/group-specific flexible and/or UL symbols, the RAN node 207 can receive CSI reports, where the CSI measurements reflect on potential interference from full duplex operation in a cell.

In an embodiment of the first solution, if the UE 205 is configured with higher layer parameter 'fullDuplexAware' within a DL SPS configuration (with SPS PDSCH to be received in at least one dynamic flexible and/or dynamic UL symbols) and if the UE 205 does not detect a DCI format indicating to the UE 205 to transmit SRS, PUSCH, PUCCH, or PRACH in dynamic flexible and/or dynamic UL symbols in a SPS PDSCH corresponding to the DL SPS configuration, the UE 205 receives the SPS PDSCH in the dynamic flexible and/or dynamic UL symbols.

In an embodiment of the first solution, if the UE 205 is configured with higher layer parameter 'fullDuplexAware' within a CG PUSCH configuration (with CG PUSCH to be received in at least one dynamic flexible and/or dynamic DL symbols) and if the UE 205 does not detect a DCI format indicating to the UE 205 to receive PDSCH or CSI-RS in dynamic flexible and/or dynamic DL symbols in a CG PUSCH corresponding to the CG PUSCH configuration, the UE 205 transmits the CG PUSCH in the dynamic flexible and/or dynamic DL symbols.

In some examples, a single higher layer parameter may be configured and is applicable to one or more of PDCCH search space configuration, CORESET configuration, CSI report configuration, a CSI resource configuration, DL SPS configuration, CG PUSCH configuration.

In some embodiments of the first solution, a UE 205 is configured to monitor a DCI format indicating slot format information specific to a full duplex aware (FDA) mode by higher layers with parameterfullDuplexSlotFormatIndicator including information of full duplex ("FD")-RNTI, a location of an SFI-index field, and a payload size of the DCI format (e.g., DCI format 2_0x). The FDA mode specific slot format information can override semi-statically configured DL/UL symbols or dynamically indicated (via legacy SFI, e.g., Rel-15/16 DCI format 2_0) DL/UL or flexible symbols.

In an example, if the UE 205 detects a DCI format 2_0x indicating a set of symbols of a slot overlapping with a particular PDCCH monitoring occasion of a CORESET configured for Type0-PDCCH CSS set (e.g., indicated by pdcch-ConfigSIB1 in MB) as uplink and if the UE 205 does not have to monitor PDCCH on the particular PDCCH monitoring occasion, the UE 205 transmits a scheduled (e.g., configured or dynamically indicated) PUSCH, PUCCH, PRACH, or SRS in the set of symbols of the slot.

In another example, if the UE 205 detects a DCI format 2_0x indicating a set of symbols of a slot overlapping with semi-statically configured DL/UL symbols (e.g., indicated by tdd-UL-DL-ConfigurationCommon or tdd-UL-DL-ConfigurationDedicated) as UL/DL symbols, the UE 205 transmits/receives a scheduled (e.g., configured or dynamically indicated) UL/DL channels/signals in the set of symbols of the slot.

In one implementation, the UE 205 does not expect to detect a DCI format 2_0x indicating a set of symbols of a slot as downlink or flexible if the set of symbols of the slot includes symbols corresponding to a high priority PUSCH/PUCCH transmission or any repetition of the high priority PUSCH/PUCCH transmission.

In an implementation, the RAN node 207 may transmit slot format information for legacy UEs (i.e., not aware of full duplex operation at the RAN node 207) and slot format information for full duplex aware UEs in one PDCCH, with separate locations of a Slot Format Indicator index ("SFI-index") field in Downlink Control Information ("DCI"), for efficient radio resource utilization. In this case, the RAN node 207 sets a value for SFI-RNTI in higher layer parameter SlotFormatIndicator configured for the legacy UEs same as a value for FD-RNTI in higher layer parameterfullDuplexSlotFormatIndicator configured for the full duplex aware UEs. In another example, a full duplex aware UE (e.g., the UE 205 configured with parameter 'fullDuplexAware') may be only configured with higher layer parameter SlotFormatIndicator with additional parameters to support FDA mode.

In an implementation, an SFI-index field can be extended to $$\max\{\lceil \log_2(\text{maxSFIindex}+1)\rceil,1\}+X_{UL}+X_{DL} \text{ bits,} \qquad \text{Equation 1}$$

where parameter maxSFIindex is the maximum value of the values provided by corresponding parameter slotFormatCombinationId, where $X_{UL}$ is a bitmap size for a bitmap, each bit indicating to allow/disallow an UL transmission in semi-statically configured DL/flexible symbols with a corresponding TCI state (or an SS/PBCH block index or an CSI-RS resource index or an SRS resource index) for an UL beam, and where $X_{DL}$ is a bitmap size for a bitmap, each bit indicating to allow/disallow a DL reception in semi-statically configured UL/flexible symbols with a corresponding TCI state (or an SS/PBCH block index or a CSI-RS resource index) for a DL beam.

The RAN node 207 can configure a group of UEs that are configured with the same set of TCI states (or likely to have the same set of active TCI states) with the same location of an SFI-index field in DCI. For UEs having different sets of TCI states, different locations of an SFI-index field may be configured.

In another implementation, the UE 205 may receive information regarding a location of an SFI-index field and a location of a TCI field within DCI format 2_0x, in the higher layer parameter fullDuplexSlotFormatIndicator, where the SFI-index field comprises $\max\{\lceil \log_2(\text{maxSFIindex}+1)\rceil,1\}$ bits and the TCI field comprises $X_{UL}+X_{DL}$ bits for the bitmaps explained above. In this implementation, the RAN node 207 can provide a group of UEs, which are configured with different sets of TCI states, with the common slot format information by configuring the group of UEs with the same location of an SFI-index field, while UE-specifically indicating allowed/disallowed transmission/reception for a particular UL/DL beam by configuring each UE with a different location of a TCI field.

According to the implementation, $X_{UL}$ and/or $X_{DL}$ values in the above can be configured, e.g., within higher layer parameterfullDuplexSlotFormatIndicator or can be implicitly indicated based on the number of configured (or activated) TCI states (alternatively, based on the number of actually transmitted SS/PBCH Blocks ("SSBs") within a SSB burst, or based on the number of configured SRS resources for PUSCH transmission). If the UE 205 does not receive explicit and/or implicit indication to use an extended SFI-index field or to use a TCI field in DCI format 2_0x, the UE 205 may assume that transmission/reception in symbols indicated as DL/UL via semi-static configuration signaling and/or legacy SFI DCI (i.e., DCI format 2_0) is allowed for all UL/DL beams.

The above extended SFI-index field can enable/disable full duplex operation for a certain UL/DL beam. The RAN node 207 may identify a combination of a DL transmit beam(s) and an UL receive beam(s) that cause a significant self-interference within the RAN node 207 or UE-to-UE interference among served UEs and may reduce the impact of interference on full-duplex operation by enabling/disabling full duplex operation for a particular UL/DL beam.

According to embodiments of a second solution, a full duplex operation in a cell may be prohibited for resources where SS/PBCH blocks are transmitted. For example, for a set of symbols of a slot corresponding to SS/PBCH blocks with candidate SS/PBCH block indices corresponding to the SS/PBCH block indexes indicated to the UE 205 by ssb-PositionsInBurst in SIB1, or by ssb-PositionsInBurst in ServingCellConfigCommon, the UE 205 does not expect to detect a DCI format 2_0x with an SFI-index field value indicating the set of symbols of the slot as uplink and does not expect to detect a UE-specific DCI format, a RAR UL grant, fallbackRAR UL grant, or successRAR, indicating to the UE 205 to perform an UL transmission on the set of symbols of the slot.

In an implementation of the second solution, a full duplex operation in a cell may be prohibited for resources where PRACH can be transmitted by one or more UEs in the cell. For example, for a set of symbols of a slot corresponding to a valid PRACH occasion and $N_{gap}$ symbols before the valid PRACH occasion, as described in Clause 8.1 of TS 38.213, the UE 205 does not expect to detect a DCI format 2_0x with an SFI-index field value indicating the set of symbols of the slot as downlink and does not expect to detect a UE-specific DCI format scheduling an DL reception on the set of symbols of the slot.

In an implementation of the second solution, if the UE 205 is configured with higher layer parameter 'fullDuplexAware', is configured by higher layers to receive a CSI-RS, a DL PRS, or a PDSCH in a set of symbols of a slot, and the UE 205 detects a DCI format 2_0x indicating a slot format with a subset of symbols from the set of symbols as uplink or flexible, or the UE 205 detects a DCI format indicating to the UE 205 to transmit PUSCH, PUCCH, SRS, or PRACH in at least one symbol in the set of the symbols, the UE 205 cancels the DL PRS reception or the CSI-RS reception in the set of symbols of the slot or cancels the PDSCH reception in the slot.

In an implementation of the second solution, if the UE 205 is configured with higher layer parameter 'fullDuplexAware', if the UE 205 is configured by higher layers to transmit SRS, or PUCCH, or PUSCH, or PRACH in a set of symbols of a slot and the UE 205 detects a DCI format 2_0x indicating a slot format with a subset of symbols from the set of symbols as downlink or flexible, or the UE 205 detects a DCI format indicating to the UE 205 to receive CSI-RS or PDSCH in a subset of symbols from the set of symbols, then the UE 205 does not expect to cancel the transmission in symbols from the set of symbols that occur, relative to a last symbol of a CORESET where the UE 205 detects the DCI format 2_0x or the DCI format, after a number of symbols that is smaller than the PUSCH preparation time $T_{proc,2}$ for the corresponding PUSCH processing capability. In certain embodiments, the UE 205 cancels the PUCCH, or the PUSCH, or an actual repetition of the PUSCH, or the PRACH transmission in remaining symbols from the set of symbols and cancels the SRS transmission in remaining symbols from the subset of symbols.

According to embodiments of a third solution, when the UE 205 performs PDSCH reception (or PUSCH transmission) in at least one symbol indicated as uplink (or downlink) via a cell-specific (e.g., tdd-UL-DL-Configuration-Common) and additionally UE-specific (e.g., tdd-UL-DL-ConfigurationDedicated) RRC configuration or via a DCI bitfield in a group common DCI format (e.g., DCI format 2_0) intended to the UE 205, the UE 205 applies an Modulation and Coding Scheme ("MCS") index table separately predefined and/or separately configured from an MCS index table predefined and/or configured for PDSCH reception (or PUSCH transmission) in all of symbols indicated as downlink (or uplink).

When the RAN node 207 is operated in full duplex mode by scheduling a first UE to transmit UL signal/channel and scheduling a second UE to receive DL signal/channel, the UL signal/channel at a receiver of the RAN node 207 may suffer from significant self-interference caused by a transmitter of the RAN node 207. Thus, the achievable UL data rate may be very low and accordingly, an MCS index table including a MCS corresponding to very low spectral efficiency (e.g., spectral efficiency of 0.0586 in Table 5.1.3.1-3 of 3GPP TS 38.214) may need to be used. For some cases, the RAN node 207 may schedule a PDSCH with a very low MCS and transmit the PDSCH with very low transmit power to the second UE, in order to minimize the self-interference to the co-scheduled UL signal/channel, which also requires using a MCS index table including a MCS corresponding to very low spectral efficiency.

In one implementation of the third solution, the MCS index table applicable for PDSCH reception (or PUSCH transmission) in at least one symbol indicated as uplink (or downlink) is predefined in 3GPP specification or configured via higher layer signaling.

In an embodiment of the third solution, if the UE 205 receives CSI-RS for channel and/or interference measurements in at least one symbol indicated as uplink via cell-specific (e.g., tdd-UL-DL-ConfigurationCommon) and additionally UE-specific (e.g., tdd-UL-DL-ConfigurationDedicated) RRC configuration or via a DCI bitfield in a group common DCI format (e.g., DCI format 2_0) intended to the UE 205, the UE 205 may use a Channel Quality Indicator ("CQI") table separately predefined and/or separately configured from a CQI table predefined and/or configured for CSI-RS reception in all of symbols indicated as downlink. For example, the UE 205 may use a CQI table of Table 5.2.2.1-4 of 3GPP TS 38.214 that has a CQI index corresponding to spectral efficiency of 0.0586.

Additionally, or alternatively, the UE 205 may use a transport block target error rate (or probability) separately predefined and/or separately configured from a transport block target error rate for CQI determination based on CSI-RS reception in all of symbols indicated as downlink.

In some examples, the CQI table in case of CSI-RS for channel and/or interference measurements in at least one symbol indicated as uplink targets the same transport block target error probability as the CQI table for CSI-RS reception in all symbols indicated as downlink.

In some examples, the MCS index table for PDSCH reception (or PUSCH transmission) in at least one symbol indicated as uplink (or downlink) targets the same (initial) transport block target error probability as the MCS table for PDSCH reception (or PUSCH transmission) in all of symbols indicated as downlink (or uplink).

In an example, a CSI report configuration (e.g., as indicated by a higher layer parameter CSI-ReportConfig) is associated with more than one CQI tables (e.g., a pair of (cqi-Table1, cqi-Table2)), where one CQI table is for CSI measurements in at least one symbol indicated as uplink and another CQI table is for CSI measurements in all symbols indicated as downlink. The UE 205 determines a pair of (CQI1, CQI2) based on (cqi-Table1, cqi-Table2).

The above example can facilitate RAN operation: A) if the RAN node 207 intends to transmit DL to a first UE while receiving UL from a second UE, the RAN node 207 could use the CQI report associated with the first CQI table cqi-Table1 (e.g., for determining the MCS) to transmit DL to the first UE, and/or B) if the RAN node 207 intends to transmit DL to a first UE when not expecting an UL transmission from a second UE, the RAN node 207 could use the CQI report associated with the second CQI table cqi-Table2 (e.g., for determining the MCS) to transmit DL to the first UE. When the UE 205 reports (CQI1, CQI2), the CSI computation time and number of CSI processing units associated with the CSI report configuration might be different from the case that the UE 205 reports only CQI1 or CQI2.

According to embodiments of a fourth solution, to allow urgent UL transmission from a UE 205 to a network entity reliably while the network entity (e.g., the RAN node 207) is also transmitting DL signal/channel to another UE, the downlink transmit power may be temporarily reduced.

In NR, the UE 205 can derive downlink CSI-RS Energy Per Resource Element ("EPRE") from Synchronization Signal/Physical Broadcast Channel ("SS/PBCH") block downlink transmit power given by the parameter ss-PBCH-BlockPower and CSI-RS power offset given by the parameter powerControlOffsetSS provided by higher layers. The downlink reference-signal transmit power is defined as the linear average over the power contributions (in [W]) of the resource elements that carry the configured CSI-RS within the operating system bandwidth.

In an embodiment of the fourth solution, the UE 205 receives information of a CSI-RS power offset value with respect to the SS/PBCH block transmit power via the parameter fullDuplexPowerControlOffsetSS, where the offset value is configured for CSI-RS reception if the CSI-RS symbols comprises at least one symbol indicated as uplink via cell-specific (e.g., tdd-UL-DL-ConfigurationCommon) and additionally UE-specific (e.g., tdd-UL-DL-ConfigurationDedicated) RRC configuration or via a DCI bitfield in a group common DCI format (e.g., DCI format 2_0) intended to the UE 205.

The UE 205 uses the fullDuplexPowerControlOffsetSS instead of powerControlOffsetSS to receive the CSI-RS. The RAN node 207 may reduce CSI-RS transmit power when the CSI-RS is transmitted with full duplex operation and/or when a CSI resource configuration and/or a CSI report configuration is configured with assumption of full duplex operation at least by the RAN node 207.

According to embodiments of a fifth solution, the UE 205 may use a different set of open-loop power control parameters (e.g., parameter 'Po' related to power spectral density per subcarrier and parameter 'alpha' (or 'a') related to partial or full compensation of pathloss) and/or may maintain a separate close-loop power control adjustment state for transmitting uplink signal/channels (e.g., PUCCH, PUSCH, PRACH, SRS) in cell-specifically/group-specifically (e.g., via DCI format 2_0) indicated flexible or downlink symbols, compared to a set of open-loop power control parameters and/or a closed-loop power control adjustment state used for transmitting uplink signal/channels in all symbols indicated as uplink.

When the UE 205 transmits an uplink channel/signal in symbols indicated as flexible or downlink, the signal-to-interference and noise ratio ("SINR") of the uplink channel/signal at a receiver of the RAN node 207 is likely to be very low due to potential DL transmission by the RAN node 207. Thus, the UE 205 may be configured to transmit the uplink channel/signal in symbols indicated as flexible or DL with higher transmit power based on a larger 'Po' value and/or a larger 'alpha' value.

Further, the UE 205 may be configured to maintain a separate power control adjustment state for transmission in symbols indicated as flexible or DL or to reset a power control adjustment state whenever switching between transmission in symbols indicated as flexible/DL and transmission in symbols indicated as UL occurs, since a co-channel interference level for full duplex operation at the RAN node 207 may be different from a co-channel interference level for half-duplex operation at the RAN node 207.

In some embodiments, the terms antenna, panel, and antenna panel are used interchangeably. An antenna panel may be a hardware that is used for transmitting and/or receiving radio signals at frequencies lower than 6 GHz, e.g., FR1, or higher than 6 GHz, e.g., frequency range 2 ("FR2", referring to radio frequencies from 24.25 GHz to 52.6 GHz) or millimeter wave ("mmWave"). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device (e.g., the UE 205, or another node) to amplify signals that are transmitted or received from one or multiple spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices such as a central unit ("CU"), it can be used for signaling or local decision making.

In some embodiments, an antenna panel may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The antenna panel may be a logical entity with physical antennas mapped to the logical entity. The mapping of physical antennas to the logical entity may be up to implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device (e.g., node) associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on implementation, a "panel" can have at least one of the following functionalities as an operational role of Unit of antenna group to control its transmit ("Tx") beam independently, Unit of antenna group to control its transmission power independently, Unit of antenna group to control its transmission timing independently. The "panel" may be transparent to another node (e.g., next hop neighbor node). For certain condition(s), another node or network entity can assume the mapping between device's physical antennas to the logical entity "panel" may not be changed. For example, the condition may include until the next update or report from device or comprise a duration of time over which the network entity (e.g., the RAN node 207) assumes there will be no change to the mapping. Device may report its capability with respect to the "panel" to the network entity. The device capability may include at least the number of "panels. In one implementation, the device may support transmission from one beam within a panel; with multiple panels, more than one beam (one beam per panel) may be used for transmission. In another implementation, more than one beam per panel may be supported/used for transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receive ("Rx") parameters. Two antenna ports may be quasi-located with respect to a subset of the large-scale properties and different subset of large-scale properties may be indicated by a Quasi-Co-Location ("QCL") Type. The QCL Type can indicate which channel properties are the same between the two reference signals (e.g., on the two antenna ports). Thus, the reference signals can be linked to each other with respect to what the device can assume about their channel statistics or QCL properties. For example, qcl-Type may take one of the following values. Other qcl-Types may be defined based on combination of one or large-scale properties:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival ("AoA"), Dominant AoA, average AoA, angular spread, Power Angular Spectrum ("PAS") of AoA, angle of departure ("AoD"), average AoD, PAS of AoD, transmit/ receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the device may not be able to perform omni-directional transmission, i.e., the device would need to form beams for directional transmission. A QCL-TypeD between two reference signals A and B, the reference signal A is considered to be spatially co-located with reference signal B and the device may assume that the reference signals A and B can be received with the same spatial filter (e.g., with the same Rx beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target reference signal ("RS") of Demodulation Reference Signal ("DM-RS") ports of the target transmission during a transmission occasion) and a source reference signal(s) (e.g., SSB/CSI-RS/SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell (e.g., between an Integrated Access and Backhaul Distributed Unit ("IAB-DU") of a parent Integrated Access and Backhaul node ("IAB node"—e.g., a type of a 5G relay station) and an Integrated Access and Backhaul Mobile Termination ("IAB-MT") of a child JAB node). In some of the embodiments described, a TCI state comprises at least one source RS to provide a reference (device assumption) for determining QCL and/or spatial filter.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 5:
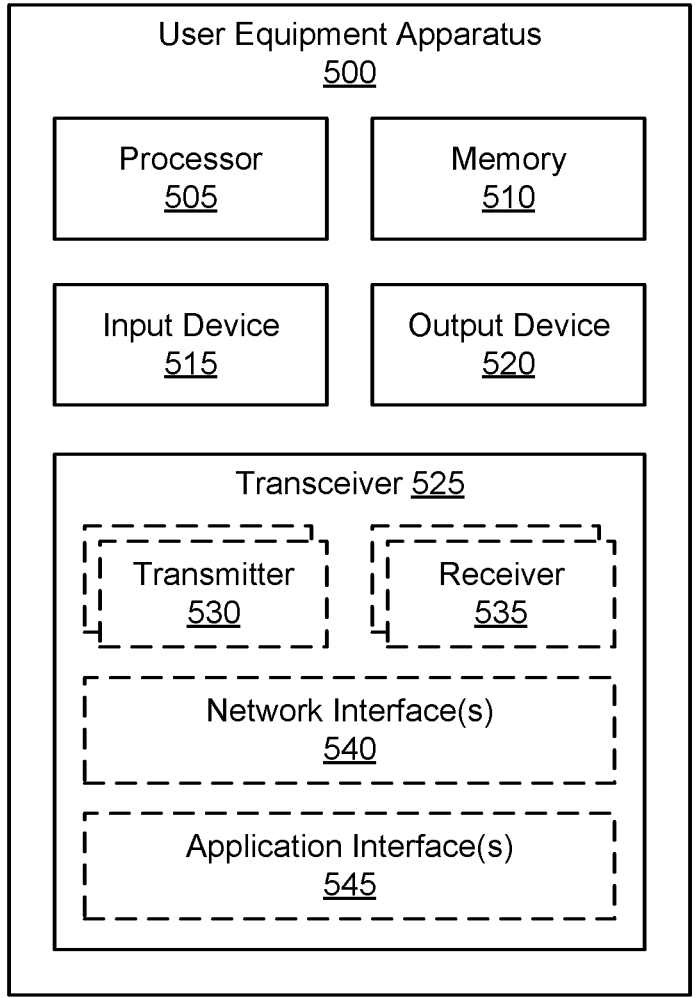
FIG. 5 is a block diagram illustrating one embodiment of a user equipment apparatus that may be used for flexible UL and DL communications with full duplex operation in a cell.

FIG. 5 depicts a user equipment apparatus 500 that may be used for flexible UL and DL communications with full duplex operation in a cell, according to embodiments of the disclosure. In various embodiments, the user equipment apparatus 500 is used to implement one or more of the solutions described above. The user equipment apparatus 500 may be one embodiment of the remote unit 105 and/or the UE 205, as described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, via the transceiver 525, the processor 505 receives a first indication to operate in a full duplex aware mode and receives slot format information of a slot. The processor 505 controls the transceiver 525 to perform uplink transmission in a first set of symbols of the slot and/or to perform downlink reception in a second set of symbols of the slot. Here, at least one symbol of the first set of symbols of the slot is a downlink symbol according to the slot format information, while at least one symbol of the second set of symbols of the slot is an uplink symbol according to the slot format information.

In some embodiments, the processor 505 receives (i.e., via the transceiver 525) a second indication to perform the at least one action. In certain embodiments, the second indication is a UE-specific indication. In other embodiments, the second indication is a group-common indication. In some embodiments, the first indication is received via higher layer signaling. In such embodiments, the first indication is associated with a particular SPS PDSCH configuration or with a particular CG PUSCH configuration.

In some embodiments, the first indication is associated with a particular search space configuration and a corresponding CORESET configuration. In certain embodiments, performing downlink reception in the second set of symbols of the slot include monitoring PDCCH in the second set of symbols of the slot based on the particular search space configuration and the corresponding CORESET configuration.

In some embodiments, the first indication is associated with at least one information selected from: A) a particular CSI report configuration, B) a particular CSI resource configuration, C) a particular NZP-CSI-RS resource, and D) a particular CSI-IM resource. In certain embodiments, performing downlink reception in the second set of symbols of the slot includes receiving at least one CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, and the first indication includes configuration information of a group-common DCI format. In such embodiments, the processor 505 detects the group-common DCI format indicating second slot format information based on the configuration information, where the at least one action selected from transmission in the first set of symbols of the slot and reception in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the processor 505 receives (i.e., via the transceiver 525) a PDSCH transmission in a set of symbols based on one of: a first MCS index table and a second MCS index table, where the first MCS index table is different than the second MCS index table. In such embodiments, receiving the PDSCH is based on the first MCS index table when all symbols of the set of symbols indicated as downlink according to the slot format information, and receiving the PDSCH is based on the second MCS index table when at least one symbol of the set of symbols is indicated as uplink according to the slot format information.

In some embodiments, the processor 505 transmits (i.e., via the transceiver 525) a PUSCH transmission in a set of symbols based on one of: a first MCS index table and a second MCS index table, where the first MCS index table is different than the second MCS index table. In such embodiments, transmitting the PUSCH is based on the first MCS index table when all symbols of the set of symbols are indicated as uplink according to the slot format information, and transmitting the PUSCH is based on the second MCS index table when at least one symbol of the set of symbols is indicated as downlink according to the slot format information.

In some embodiments, the processor 505 determines a transmit power for an uplink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as uplink according to the slot format information, and the second set of power control parameters is used when at least one symbol of the set of symbols is indicated as downlink according to the slot format information.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to flexible UL and DL communications with full duplex operation in the cell. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
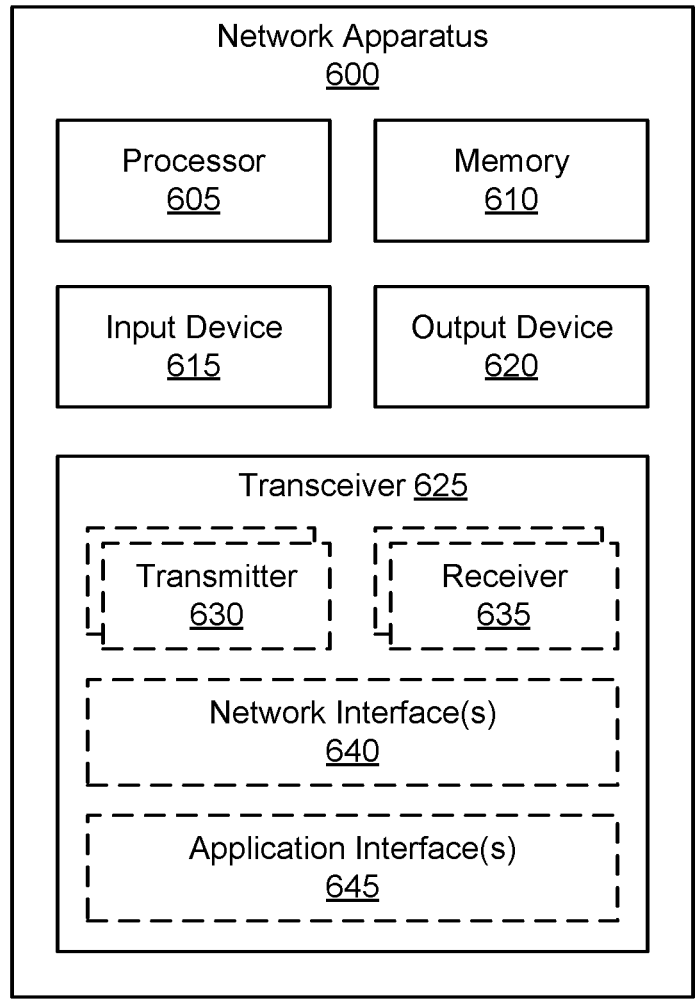
FIG. 6 is a block diagram illustrating one embodiment of a network apparatus that may be used for flexible UL and DL communications with full duplex operation.

FIG. 6 depicts a network apparatus 600 that may be used for flexible UL and DL communications with full duplex operation, according to embodiments of the disclosure. In one embodiment, network apparatus 600 may be one implementation of a RAN device, such as the base unit 121 and/or RAN node 207, as described above. Furthermore, the network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, via the transceiver 625, the processor 605 transmits a first indication to operate in a full duplex aware mode and transmits slot format information of a slot. The processor 605 controls the transceiver 625 to perform at least one action selected from: uplink reception in a first set of symbols of the slot and downlink transmission in a second set of symbols of the slot, where at least one symbol of the first set of symbols of the slot is a downlink symbol according to the slot format information, and where at least one symbol of the second set of symbols of the slot is an uplink symbol according to the slot format information.

In some embodiments, the processor 605 transmits (i.e., via the transceiver 625) a second indication to perform the at least one action. In certain embodiments, the second indication is a UE-specific indication. In other embodiments, the second indication may be a group-common indication. In some embodiments, the first indication is transmitted to the UE via higher layer signaling. In such embodiments, the first indication may be associated with a particular SPS PDSCH configuration or with a particular CG PUSCH configuration.

In some embodiments, the first indication is associated with a particular search space configuration and a corresponding CORESET configuration. In certain embodiments, performing downlink transmission in the second set of symbols of the slot includes transmitting PDCCH in the second set of symbols of the slot based on the particular search space configuration and the corresponding CORESET configuration.

In some embodiments, the first indication is associated with at least one information selected from: A) a particular CSI report configuration, B) a particular CSI resource configuration, C) a particular NZP-CSI-RS resource, and/or D) a particular CSI-IM resource. In certain embodiments, performing downlink transmission in the second set of symbols of the slot includes transmitting CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, where the first indication includes configuration information of a group-common DCI format, where the transceiver 625 further includes transmits the group-common DCI format, said group-common DCI format indicating second slot format information based on the configuration information. In such embodiments, the reception in the first set of symbols of the slot and/or the transmission in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the processor 605 transmits (i.e., via the transceiver 625) a PDSCH transmission in a set of symbols based on one of: a first MCS index table and a second MCS index table, where the first MCS index table is different than the second MCS index table. In such embodiments, transmitting the PDSCH is based on the first MCS index table when all symbols of the set of symbols indicated as downlink according to the slot format information, and transmitting the PDSCH is based on the second MCS index table when at least one symbol of the set of symbols is indicated as uplink according to the slot format information.

In some embodiments, the processor 605 receives (i.e., via the transceiver 625) a PUSCH transmission in a set of symbols based on one of: a first MCS index table and a second MCS index table, where the first MCS index table is different than the second MCS index table. In such embodiments, receiving the PUSCH is based on the first MCS index table when all symbols of the set of symbols are indicated as uplink according to the slot format information, and receiving the PUSCH is based on the second MCS index table when at least one symbol of the set of symbols is indicated as downlink according to the slot format information.

In some embodiments, the processor 605 further determines a transmit power for a downlink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as downlink according to the slot format information, and the second set of power control parameters is used when at least one symbol of the set of symbols is indicated as uplink according to the slot format information.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to flexible UL and DL communications with full duplex operation. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the Public Land Mobile Network ("PLMN") and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

FIG. 7 depicts one embodiment of a method 700 for flexible UL and DL communications with full duplex operation in a cell, according to embodiments of the disclosure. In various embodiments, the method 700 is performed by a UE device, such as the remote unit 105, the UE 205, and/or the user equipment apparatus 500, described above as described above. In some embodiments, the method 700 is performed by a processor, such as a microcontroller, a microprocessor, a CPU, a GPU, an auxiliary processing unit, a FPGA, or the like.

The method 700 begins and receives 705 a first indication from a RAN to operate in a full duplex aware mode. The method 700 includes receiving 710 slot format information of a slot. The method 700 includes performing 715 uplink transmission in a first set of symbols of the slot and/or downlink reception in a second set of symbols of the slot, where at least one symbol of the first set of symbols of the slot is a downlink symbol according to the slot format information, and where at least one symbol of the second set of symbols of the slot is an uplink symbol according to the slot format information. The method 700 ends.

FIG. 8 depicts one embodiment of a method 800 for flexible UL and DL communications with full duplex operation, according to embodiments of the disclosure. In various embodiments, the method 800 is performed by a network entity, such as the base unit 121, the RAN node 207, and/or the network apparatus 600, described above as described above. In some embodiments, the method 800 is performed by a processor, such as a microcontroller, a microprocessor, a CPU, a GPU, an auxiliary processing unit, a FPGA, or the like.

The method 800 begins and transmits 805 a first indication to a UE to operate in a full duplex aware mode. The method 800 includes transmitting 810 slot format information of a slot. The method 800 includes performing 815 uplink reception in a first set of symbols of the slot and/or downlink transmission in a second set of symbols of the slot, where at least one symbol of the first set of symbols of the slot is a downlink symbol according to the slot format information, and where at least one symbol of the second set of symbols of the slot is an uplink symbol according to the slot format information. The method 800 ends.

Disclosed herein is a first apparatus for flexible UL and DL communications with full duplex operation in a cell, according to embodiments of the disclosure. The first apparatus may be implemented by a UE device, such as the remote unit 105, the UE 205, and/or the user equipment apparatus 500, described above. The first apparatus includes a processor and a transceiver that receives a first indication to operate in a full duplex aware mode and receives slot format information of a slot. The processor controls the transceiver to perform at least one action selected from: uplink transmission in a first set of symbols of the slot and downlink reception in a second set of symbols of the slot, where at least one symbol of the first set of symbols of the slot is a downlink symbol according to the slot format information, and where at least one symbol of the second set of symbols of the slot is an uplink symbol according to the slot format information.

In some embodiments, the transceiver further receives a second indication to perform the at least one action. In certain embodiments, the second indication is a UE-specific indication. In other embodiments, the second indication is a group-common indication. In some embodiments, the first indication is received via higher layer signaling. In such embodiments, the first indication is associated with a particular SPS PDSCH configuration or with a particular CG PUSCH configuration.

In some embodiments, the first indication is associated with a particular search space configuration and a corresponding CORESET configuration. In certain embodiments, performing downlink reception in the second set of symbols of the slot include monitoring PDCCH in the second set of symbols of the slot based on the particular search space configuration and the corresponding CORESET configuration.

In some embodiments, the first indication is associated with at least one information selected from: A) a particular CSI report configuration, B) a particular CSI resource configuration, C) a particular NZP-CSI-RS resource, and D) a particular CSI-IM resource. In certain embodiments, performing downlink reception in the second set of symbols of the slot includes receiving at least one CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, and the first indication includes configuration information of a group-common DCI format. In such embodiments, the processor further detects the group-common DCI format indicating second slot format information based on the configuration information, where the at least one action selected from transmission in the first set of symbols of the slot and reception in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the transceiver further receives a PDSCH transmission in a set of symbols based on one of: a first MCS index table and a second MCS index table, where the first MCS index table is different than the second MCS index table. In such embodiments, receiving the PDSCH is based on the first MCS index table when all symbols of the set of symbols indicated as downlink according to the slot format information, and receiving the PDSCH is based on the second MCS index table when at least one symbol of the set of symbols is indicated as uplink according to the slot format information.

In some embodiments, the transceiver further transmits a PUSCH transmission in a set of symbols based on one of: a first MCS index table and a second MCS index table, where the first MCS index table is different than the second MCS index table. In such embodiments, transmitting the PUSCH is based on the first MCS index table when all symbols of the set of symbols are indicated as uplink according to the slot format information, and transmitting the PUSCH is based on the second MCS index table when at least one symbol of the set of symbols is indicated as downlink according to the slot format information.

In some embodiments, the processor further determines a transmit power for an uplink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as uplink according to the slot format information, and the second set of power control parameters is used when at least one symbol of the set of symbols is indicated as downlink according to the slot format information.

Disclosed herein is a first method for flexible UL and DL communications with full duplex operation in a cell, according to embodiments of the disclosure. The first method may be performed by a UE device, such as the remote unit 105, the UE 205, and/or the user equipment apparatus 500, described above. The first method includes receiving a first indication to operate in a full duplex aware mode and receiving slot format information of a slot. The first method includes performing at least one action selected from: uplink transmission in a first set of symbols of the slot and downlink reception in a second set of symbols of the slot, where at least one symbol of the first set of symbols of the slot is a downlink symbol according to the slot format information, and where at least one symbol of the second set of symbols of the slot is an uplink symbol according to the slot format information.

In some embodiments, the first method further includes receiving a second indication to perform the at least one action. In certain embodiments, the second indication is a UE-specific indication. In other embodiments, the second indication is a group-common indication. In some embodiments, the first indication is received via higher layer signaling. In such embodiments, the first indication is associated with a particular SPS PDSCH configuration or with a particular CG PUSCH configuration.

In some embodiments, the first indication is associated with a particular search space configuration and a corresponding CORESET configuration. In certain embodiments, performing downlink reception in the second set of symbols of the slot include monitoring PDCCH in the second set of symbols of the slot based on the particular search space configuration and the corresponding CORESET configuration.

In some embodiments, the first indication is associated with at least one information selected from: A) a particular CSI report configuration, B) a particular CSI resource configuration, C) a particular NZP-CSI-RS resource, and D) a particular CSI-IM resource. In certain embodiments, performing downlink reception in the second set of symbols of the slot includes receiving at least one CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, and the first indication includes configuration information of a group-common DCI format. In such embodiments, the first method further includes detecting the group-common DCI format indicating second slot format information based on the configuration information, where the at least one action selected from transmission in the first set of symbols of the slot and reception in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the first method further includes receiving a PDSCH transmission in a set of symbols based on one of: a first MCS index table and a second MCS index table, where the first MCS index table is different than the second MCS index table. In such embodiments, receiving the PDSCH is based on the first MCS index table when all symbols of the set of symbols indicated as downlink according to the slot format information, and receiving the PDSCH is based on the second MCS index table when at least one symbol of the set of symbols is indicated as uplink according to the slot format information.

In some embodiments, the first method further includes transmitting a PUSCH transmission in a set of symbols based on one of: a first MCS index table and a second MCS index table, where the first MCS index table is different than the second MCS index table. In such embodiments, transmitting the PUSCH is based on the first MCS index table when all symbols of the set of symbols are indicated as uplink according to the slot format information, and transmitting the PUSCH is based on the second MCS index table when at least one symbol of the set of symbols is indicated as downlink according to the slot format information.

In some embodiments, the first method further includes determining a transmit power for an uplink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as uplink according to the slot format information, and the second set of power control parameters is used when at least one symbol of the set of symbols is indicated as downlink according to the slot format information.

Disclosed herein is a second apparatus for flexible UL and DL communications with full duplex operation, according to embodiments of the disclosure. The second apparatus may be implemented by a network entity, such as the base unit 121, the RAN node 207, and/or the network apparatus 600, described above. The second apparatus includes a processor and a transceiver that transmits a first indication to operate in a full duplex aware mode and transmits slot format information of a slot. The processor controls the transceiver to perform at least one action selected from: uplink reception in a first set of symbols of the slot and downlink transmission in a second set of symbols of the slot, where at least one symbol of the first set of symbols of the slot is a downlink symbol according to the slot format information, and where at least one symbol of the second set of symbols of the slot is an uplink symbol according to the slot format information.

In some embodiments, the transceiver further transmits a second indication to perform the at least one action. In certain embodiments, the second indication is a UE-specific indication. In other embodiments, the second indication may be a group-common indication.

In some embodiments, the first indication is transmitted to the UE via higher layer signaling. In such embodiments, the first indication may be associated with a particular SPS PDSCH configuration or with a particular CG PUSCH configuration.

In some embodiments, the first indication is associated with a particular search space configuration and a corresponding CORESET configuration. In certain embodiments, performing downlink transmission in the second set of symbols of the slot includes transmitting PDCCH in the second set of symbols of the slot based on the particular search space configuration and the corresponding CORE-SET configuration.

In some embodiments, the first indication is associated with at least one information selected from: A) a particular CSI report configuration, B) a particular CSI resource configuration, C) a particular NZP-CSI-RS resource, and/or D) a particular CSI-IM resource. In certain embodiments, performing downlink transmission in the second set of symbols of the slot includes transmitting CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, where the first indication includes configuration information of a group-common DCI format, where the transceiver further includes transmits the group-common DCI format, said group-common DCI format indicating second slot format information based on the configuration information. In such embodiments, the reception in the first set of symbols of the slot and/or the transmission in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the transceiver further transmits a PDSCH transmission in a set of symbols based on one of: a first MCS index table and a second MCS index table, where the first MCS index table is different than the second MCS index table. In such embodiments, transmitting the PDSCH is based on the first MCS index table when all symbols of the set of symbols indicated as downlink according to the slot format information, and transmitting the PDSCH is based on the second MCS index table when at least one symbol of the set of symbols is indicated as uplink according to the slot format information.

In some embodiments, the transceiver further receives a PUSCH transmission in a set of symbols based on one of: a first MCS index table and a second MCS index table, where the first MCS index table is different than the second MCS index table. In such embodiments, receiving the PUSCH is based on the first MCS index table when all symbols of the set of symbols are indicated as uplink according to the slot format information, and receiving the PUSCH is based on the second MCS index table when at least one symbol of the set of symbols is indicated as downlink according to the slot format information.

In some embodiments, the processor further determines a transmit power for a downlink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as downlink according to the slot format information, and the second set of power control parameters is used when at least one symbol of the set of symbols is indicated as uplink according to the slot format information.

Disclosed herein is a second method for flexible UL and DL communications with full duplex operation, according to embodiments of the disclosure. The second method may be performed by a network entity, such as the base unit 121, the RAN node 207, and/or the network apparatus 600, described above. The second method includes transmitting a first indication to a UE to operate in a full duplex aware mode and transmitting slot format information of a slot. The second method includes performing at least one action selected from: uplink reception in a first set of symbols of the slot and/or downlink transmission in a second set of symbols of the slot, where at least one symbol of the first set of symbols of the slot is a downlink symbol according to the slot format information, and where at least one symbol of the second set of symbols of the slot is an uplink symbol according to the slot format information.

In some embodiments, the second method further includes transmitting a second indication to perform the at least one action. In certain embodiments, the second indication is a UE-specific indication. In other embodiments, the second indication may be a group-common indication. In some embodiments, the first indication is transmitted to the UE via higher layer signaling. In such embodiments, the first indication may be associated with a particular SPS PDSCH configuration or with a particular CG PUSCH configuration.

In some embodiments, the first indication is associated with a particular search space configuration and a corresponding CORESET configuration. In certain embodiments, performing downlink transmission in the second set of symbols of the slot includes transmitting PDCCH in the second set of symbols of the slot based on the particular search space configuration and the corresponding CORESET configuration.

In some embodiments, the first indication is associated with at least one information selected from: A) a particular CSI report configuration, B) a particular CSI resource configuration, C) a particular NZP-CSI-RS resource, and/or D) a particular CSI-IM resource. In certain embodiments, performing downlink transmission in the second set of symbols of the slot includes transmitting CSI-RS based on the at least one associated information, i.e., the particular CSI report configuration, the particular CSI resource configuration, the particular NZP-CSI-RS resource, and/or the particular CSI-IM resource.

In certain embodiments, the particular CSI report configuration includes CQI table configuration containing a first CQI table and a second CQI table. In such embodiments, the first CQI table is associated with CSI measurements in a set of symbols indicated as downlink according to the slot format information, and the second CQI table is associated with CSI measurements in another set of symbols, where at least one symbol of the set of symbols is indicated as uplink according to the slot format information. Here, the first CQI table is different than the second CQI table.

In some embodiments, the slot format information includes first slot format information, and the first indication includes configuration information of a group-common DCI format. In such embodiments, the second method further includes transmitting the group-common DCI format indicating second slot format information based on the configuration information, where the reception in the first set of symbols of the slot and/or the transmission in the second set of symbols of the slot is performed based on the second slot format information.

In certain embodiments, the configuration information includes information of a first location for an SFI-index field and a second location for a TCI field, where the TCI field includes information of uplink beams that are allowed to be used for transmission in a downlink symbol and/or information of downlink beams that are allowed to be used for reception in an uplink symbol. In such embodiments, the downlink symbol and the uplink symbol are determined based on the first slot format information.

In some embodiments, the second method further includes transmitting a PDSCH transmission in a set of symbols based on one of: a first MCS index table and a second MCS index table, where the first MCS index table is different than the second MCS index table. In such embodiments, transmitting the PDSCH is based on the first MCS index table when all symbols of the set of symbols indicated as downlink according to the slot format information, and transmitting the PDSCH is based on the second MCS index table when at least one symbol of the set of symbols is indicated as uplink according to the slot format information.

In some embodiments, the second method further includes receiving a PUSCH transmission in a set of symbols based on one of: a first MCS index table and a second MCS index table, where the first MCS index table is different than the second MCS index table. In such embodiments, receiving the PUSCH is based on the first MCS index table when all symbols of the set of symbols are indicated as uplink according to the slot format information, and receiving the PUSCH is based on the second MCS index table when at least one symbol of the set of symbols is indicated as downlink according to the slot format information.

In some embodiments, the second method further includes determining a transmit power for a downlink channel to be transmitted in a set of symbols based on one of: a first set of power control parameters and a second set of power control parameters, where values of the first set of power control parameters are different than values of the second set of power control parameters. In such embodiments, the first set of power control parameters is used when all symbols of the set of symbols are indicated as downlink according to the slot format information, and the second set of power control parameters is used when at least one symbol of the set of symbols is indicated as uplink according to the slot format information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a User Equipment ("UE"), the method comprising:

receiving an indication to operate in a full duplex aware mode;

receiving slot format information of a slot, wherein the slot format information comprises at least one slot format selected from indications of a downlink symbol, an uplink symbol, and a flexible symbol; and performing at least one action selected from: uplink transmission in a first set of symbols of the slot and downlink reception in a second set of symbols of the slot, wherein at least one symbol of the first set of symbols of the slot is a downlink symbol according to the slot format information, and wherein at least one symbol of the second set of symbols of the slot is an uplink symbol according to the slot format information.

2. The method of claim 1, wherein the indication is a first indication and the method further comprises receiving a second indication to perform the at least one action.

3. The method of claim 1, wherein the indication is received via higher layer signaling, wherein the indication is associated with one of: a particular Semi-Persistent Scheduling ("SPS") Physical Downlink Shared Channel ("PDSCH") configuration; or a particular Configured Grant ("CG") Physical Uplink Shared Channel ("PUSCH") configuration.

4. The method of claim 1, wherein the indication is associated with a particular search space configuration and a corresponding Control Resource Set ("CORESET") configuration.

5. The method of claim 4, wherein the downlink reception in the second set of symbols of the slot comprises monitoring Physical Downlink Control Channel ("PDCCH") in the second set of symbols of the slot based on the particular search space configuration and the corresponding CORESET configuration.

6. The method of claim 1, wherein the indication is associated with at least one selected from a particular Channel State Information ("CSI") report configuration, a particular CSI resource configuration, a particular non-zero power CSI reference signal ("NZP-CSI-RS") resource, and a particular Channel State Information for Interference Measurement ("CSI-IM") resource.

7. The method of claim 6, wherein the downlink reception in the second set of symbols of the slot comprises receiving at least one CSI reference signal ("CSI-RS") based on the at least one selected from the particular CSI report configuration, the particular CSI resource configuration, the particular NZP-CSI-RS resource, and the particular CSI-IM resource.

8. The method of claim 6, wherein the particular CSI report configuration includes Channel Quality Indicator ("CQI") table configuration comprising a first CQI table and a second CQI table, wherein the first CQI table is associated with CSI measurements in a set of symbols indicated as downlink according to the slot format information, wherein the second CQI table is associated with CSI measurements in another set of symbols, where at least one symbol of the set of symbols is indicated as uplink according to the slot format information, and wherein the first CQI table is different than the second CQI table.

9. The method of claim 1, wherein the slot format information is first slot format information;

wherein the indication comprises configuration information of a group-common DCI format; and wherein the method further comprises detecting the group-common DCI format indicating second slot format information based on the configuration information, wherein the at least one action selected from transmission in the first set of symbols of the slot and reception in the second set of symbols of the slot is performed based on the second slot format information.

10. The method of claim 9, wherein the configuration information comprises information of a first location for a Slot Format Indicator ("SFI")-index field and a second location for a Transmission Configuration Indicator ("TCI") field, wherein the TCI field comprises at least one selected from information of uplink beams that are allowed to be used for transmission in a downlink symbol and information of downlink beams that are allowed to be used for reception in an uplink symbol, wherein the downlink symbol and the uplink symbol are determined based on the first slot format information.

11. The method of claim 1, further comprising:

receiving a Physical Downlink Shared Channel ("PDSCH") transmission in a set of symbols based on one of: a first Modulation and Coding Scheme ("MCS") index table and a second MCS index table, wherein the first MCS index table is different than the second MCS index table, wherein receiving the PDSCH is based on the first MCS index table when all symbols of the set of symbols indicated as downlink according to the slot format information, and wherein receiving the PDSCH is based on the second MCS index table when at least one symbol of the set of symbols is indicated as uplink according to the slot format information.

12. The method of claim 1, further comprising:

transmitting a Physical Uplink Shared Channel ("PUSCH") transmission in a set of symbols based on one of: a first Modulation and Coding Scheme ("MCS") index table and a second MCS index table, wherein the first MCS index table is different than the second MCS index table, wherein transmitting the PUSCH is based on the first MCS index table when all symbols of the set of symbols are indicated as uplink according to the slot format information, and wherein transmitting the PUSCH is based on the second MCS index table when at least one symbol of the set of symbols is indicated as downlink according to the slot format information.

13. The method of claim 1, further comprising:

determining a transmit power for an uplink channel to be transmitted in a set of symbols based on one of: a first set of power control parameters and a second set of power control parameters, wherein values of the first set of power control parameters are different than values of the second set of power control parameters, wherein the first set of power control parameters is used when all symbols of the set of symbols are indicated as uplink according to the slot format information, and wherein the second set of power control parameters is used when at least one symbol of the set of symbols is indicated as downlink according to the slot format information.

14. The method of claim 1, wherein:

the indication comprises a first indication; and the method further comprises:

receiving a second indication, the second indication comprising a full duplex indication and a grant; and performing the at least one action in response to the first indication and the second indication;

the uplink transmission in the first set of symbols of the slot comprises an uplink transmission in a first symbol of the slot;

the first symbol comprises a downlink symbol according to the slot format information;

the downlink reception in the second set of symbols of the slot comprises a downlink reception in a second symbol of the slot; and the second symbol comprises an uplink symbol according to the slot format information.

15. The method of claim 1, wherein:

the indication comprises a first indication;

the first indication comprises configuration information of a group-common downlink control information ("DCI") format;

the method further comprises receiving a second indication, the second indication comprising at least one of a grant and a UE-specific DCI format; and the method further comprises performing the at least one action based on the second indication.

16. A user equipment ("UE") comprising:

at least one memory;

at least one processor coupled with the at least one memory and configured to cause the UE to:

receive an indication to operate in a full duplex aware mode;

receive slot format information of a slot, wherein the slot format information comprises at least one slot format selected from indications of a downlink symbol, an uplink symbol, and a flexible symbol; and perform at least one action selected from: uplink transmission in a first set of symbols of the slot and downlink reception in a second set of symbols of the slot, wherein at least one symbol of the first set of symbols of the slot is a downlink symbol according to the slot format information, and wherein at least one symbol of the second set of symbols of the slot is an uplink symbol according to the slot format information.

17. A base station, comprising:

at least one memory;

at least one processor coupled with the at least one memory and configured to cause the base station to:

transmit an indication to operate in a full duplex aware mode;

transmit slot format information of a slot, wherein the slot format information comprises at least one slot format selected from indications of a downlink symbol, an uplink symbol, and a flexible symbol; and perform at least one action selected from: uplink reception in a first set of symbols of the slot and downlink transmission in a second set of symbols of the slot, wherein at least one symbol of the first set of symbols of the slot is a downlink symbol according to the slot format information, and wherein at least one symbol of the second set of symbols of the slot is an uplink symbol according to the slot format information.

* * * * *